United States Patent
Lee et al.

(10) Patent No.: US 10,034,308 B2
(45) Date of Patent: Jul. 24, 2018

(54) METHOD FOR ALLOCATING TEMPORARY IDENTIFIER TO TERMINAL IN RANDOM ACCESS PROCEDURE IN WIRELESS COMMUNICATION SYSTEM AND APPARATUS THEREFOR

(71) Applicant: LG ELECTRONICS INC., Seoul (KR)

(72) Inventors: Eunjong Lee, Seoul (KR); Jaehoon Chung, Seoul (KR); Genebeck Hahn, Seoul (KR); Jinmin Kim, Seoul (KR); Kukheon Choi, Seoul (KR); Kwangseok Noh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/124,898

(22) PCT Filed: Feb. 12, 2015

(86) PCT No.: PCT/KR2015/001416

§ 371 (c)(1),
(2) Date: Sep. 9, 2016

(87) PCT Pub. No.: WO2015/137632

PCT Pub. Date: Sep. 17, 2015

(65) Prior Publication Data

US 2017/0019930 A1    Jan. 19, 2017

Related U.S. Application Data

(60) Provisional application No. 61/951,477, filed on Mar. 11, 2014.

(51) Int. Cl.
*H04W 72/04* (2009.01)
*H04W 74/08* (2009.01)
(Continued)

(52) U.S. Cl.
CPC ... *H04W 74/0833* (2013.01); *H04W 72/0413* (2013.01); *H04W 72/1284* (2013.01);
(Continued)

(58) Field of Classification Search
None
See application file for complete search history.

(56) References Cited

U.S. PATENT DOCUMENTS

| 2013/0034087 A1 | 2/2013 | Kwon et al. |
| 2013/0064192 A1 | 3/2013 | Iwamura et al. |

(Continued)

FOREIGN PATENT DOCUMENTS

| WO | WO 2011/129601 A2 | 10/2011 |
| WO | WO 2013/069994 A1 | 5/2013 |

OTHER PUBLICATIONS

Alcatel-Lucent Shanghai Bell et al., "Common Search Space on SeNB for Dual Connectivity", R1-140167, 3GPP TSG RAN WG1 Meeting #76, Prague, Czech Republic, Feb. 10-14, 2014, See pp. 1-3.

(Continued)

*Primary Examiner* — Duc T Duong
(74) *Attorney, Agent, or Firm* — Birch, Stewart, Kolasch & Birch, LLP

(57) ABSTRACT

Provided are a method for allocating a temporary radio network temporary identifier to a terminal within a random access procedure in a wireless communication system, and an apparatus supporting the same. The method for allocating a temporary radio network temporary identifier (T-RNTI) to a user equipment (UE) within a random access procedure in a wireless communication system, includes transmitting, by the UE, a random access preamble to a base station (BS), transmitting, by the UE, a radio resource control (RRC) request message to the BS through a contention-based physical uplink shared channel (PUSCH) resource block in which uplink data can be transmitted without uplink resource allocation scheduling, and receiving, by the UE, an RRC connection setup message identified by a T-RNTI allocated to the UE in response to the RRC request message, (Continued)

wherein the T-RNTI is allocated on the basis of the contention-based PUSCH resource block in which the RRC request message has been transmitted.

10 Claims, 22 Drawing Sheets

(51) Int. Cl.
*H04W 76/02* (2009.01)
*H04W 72/12* (2009.01)
*H04W 88/02* (2009.01)
*H04W 88/08* (2009.01)
*H04W 8/26* (2009.01)

(52) U.S. Cl.
CPC .............. *H04W 8/26* (2013.01); *H04W 88/02* (2013.01); *H04W 88/08* (2013.01)

(56) References Cited

U.S. PATENT DOCUMENTS

| | | | |
|---|---|---|---|
| 2014/0010212 A1* | 1/2014 | McNamara | H04W 72/1289 370/336 |
| 2014/0269632 A1* | 9/2014 | Blankenship | H04W 76/025 370/336 |
| 2014/0321442 A1 | 10/2014 | Kim et al. | |
| 2015/0282210 A1* | 10/2015 | Li | H04W 74/004 455/436 |
| 2016/0309282 A1* | 10/2016 | Xu | H04W 4/005 |

OTHER PUBLICATIONS

Nokia Corporation et al., "Allocation of RNTI values", R2-080987, 3GPP TSG-RAN WG2 Meeting #61, Sorrento, Italy, Feb. 11-15, 2008, See pp. 1-6.

* cited by examiner

[Fig. 1]
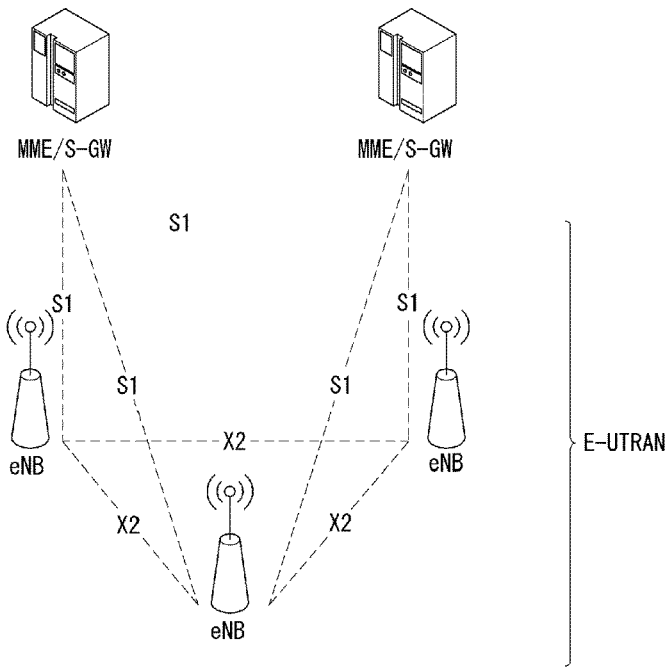
[Fig. 2]
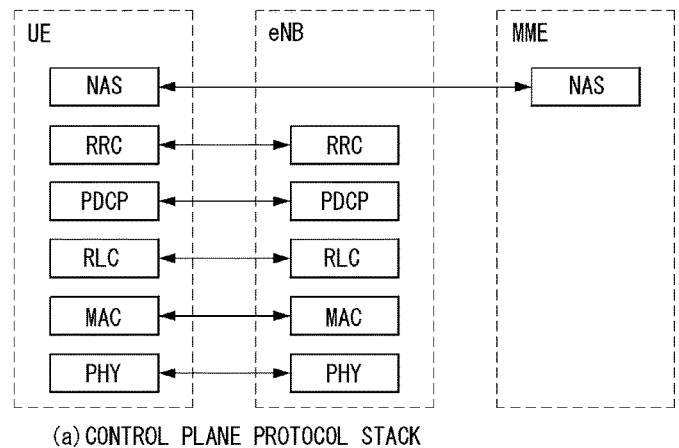
(a) CONTROL PLANE PROTOCOL STACK
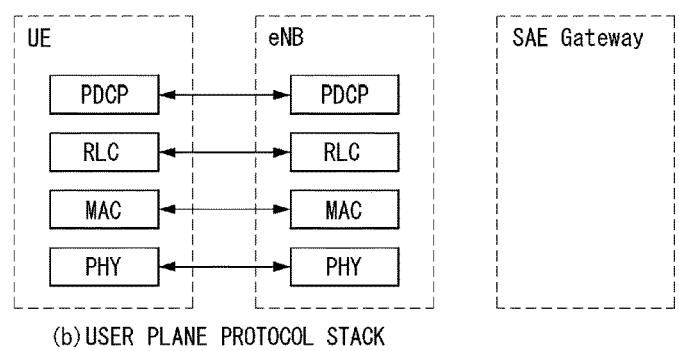
(b) USER PLANE PROTOCOL STACK

[Fig. 3]
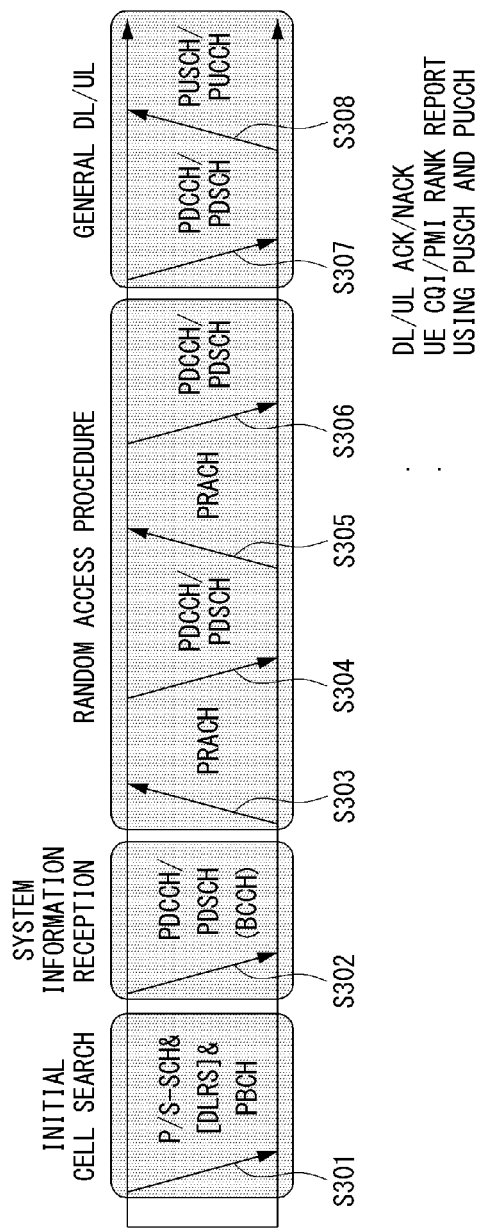

[Fig. 4]
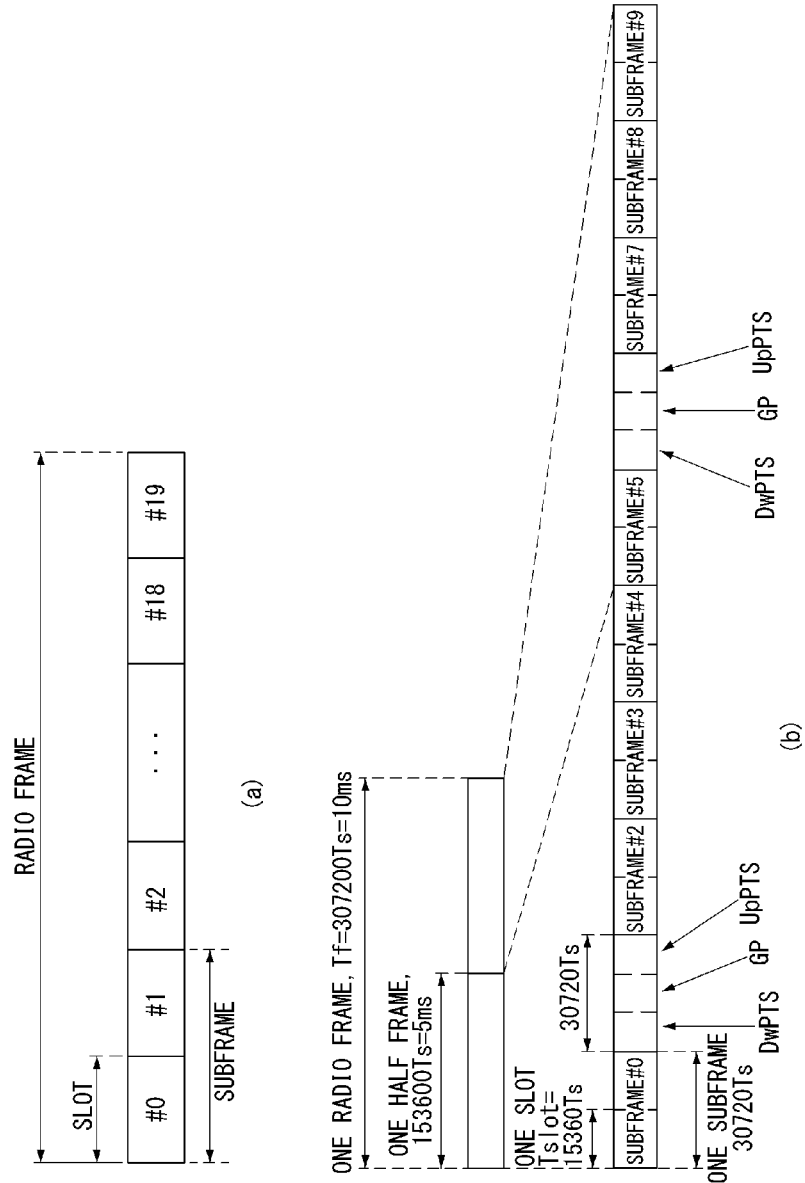

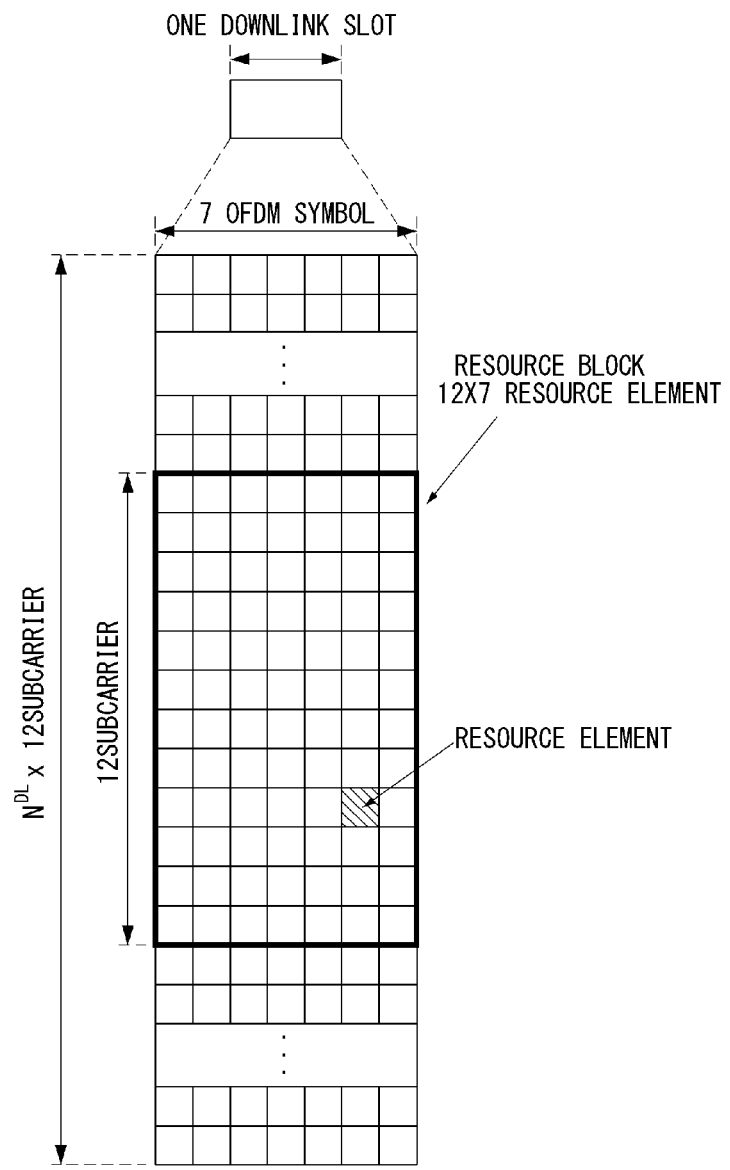
[Fig. 5]

[Fig. 6]
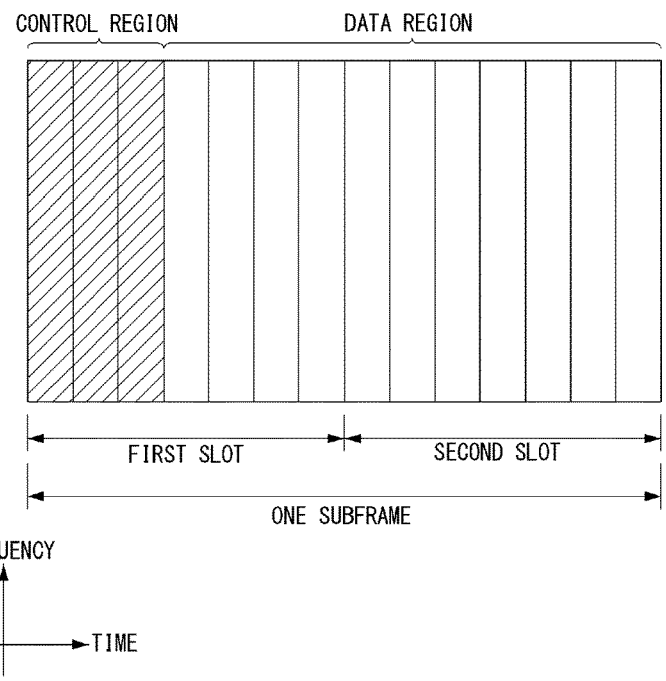
[Fig. 7]
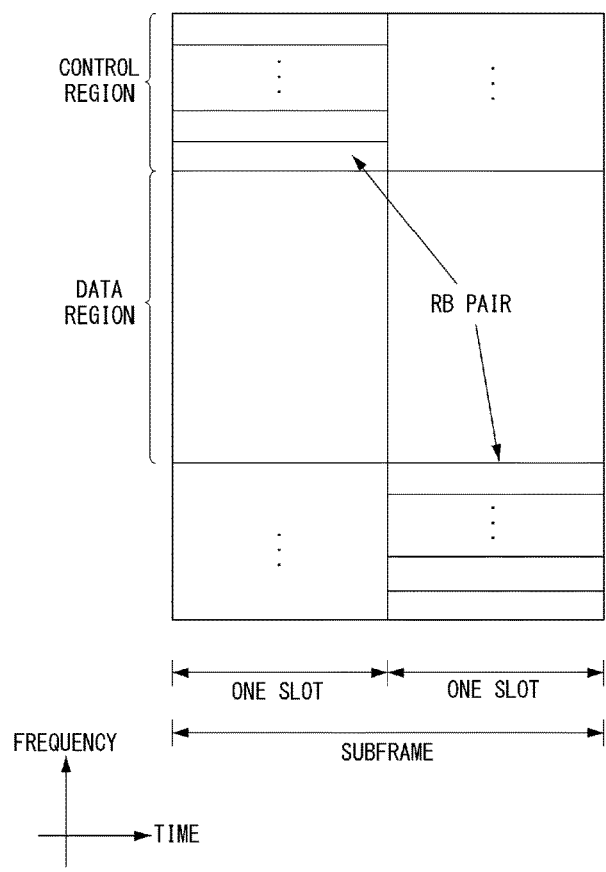

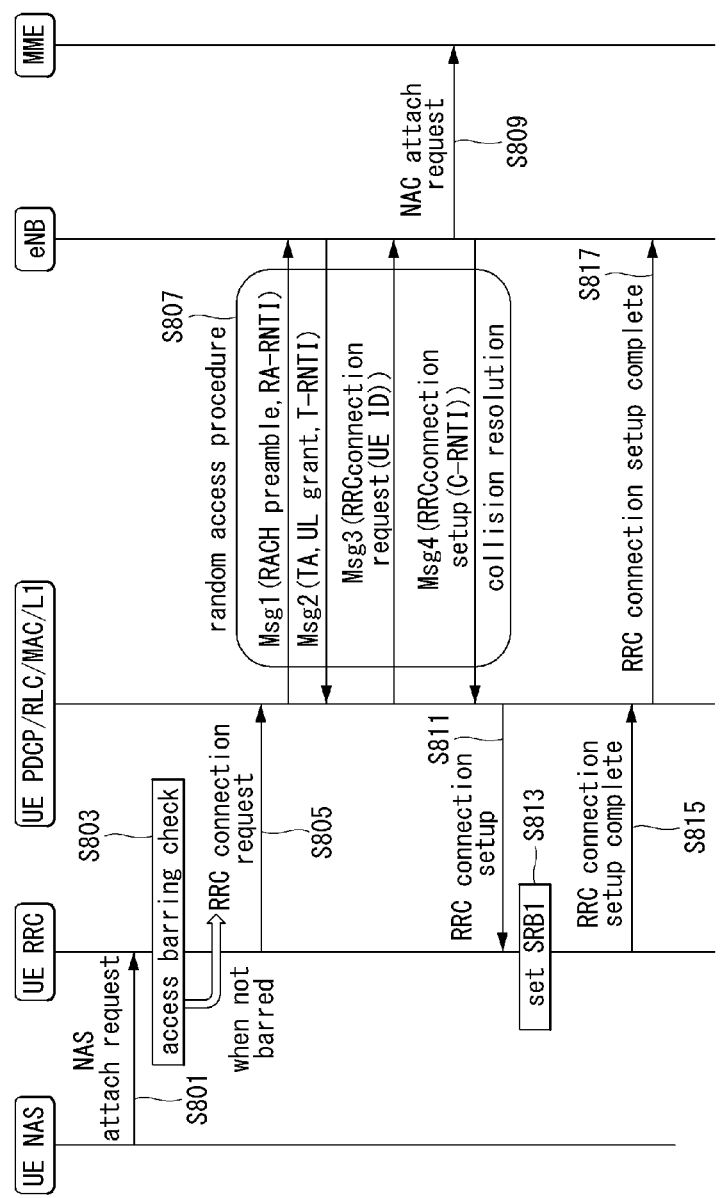

[Fig. 9]
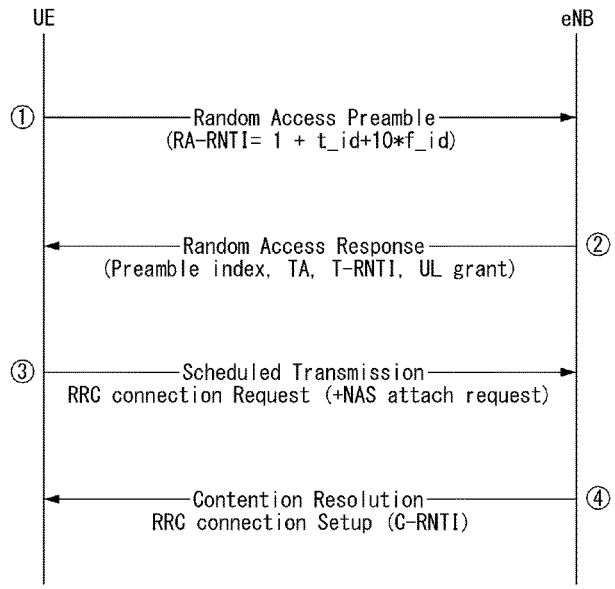
[Fig. 10]
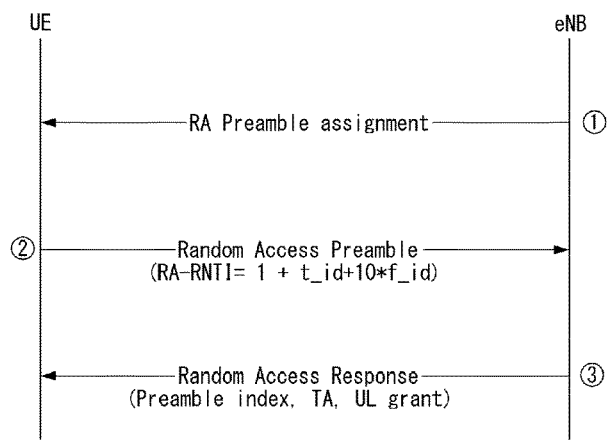
[Fig. 11]
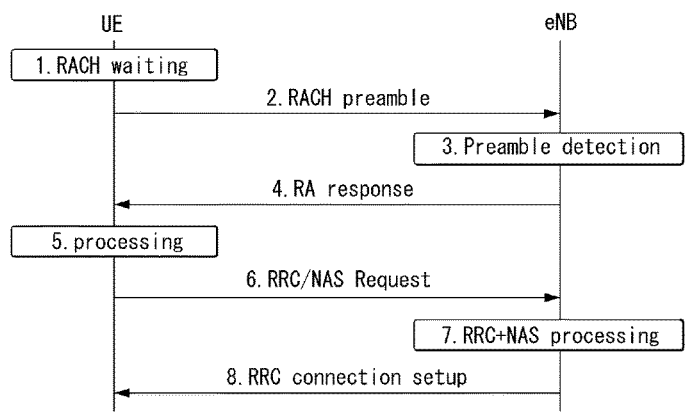

[Fig. 12]
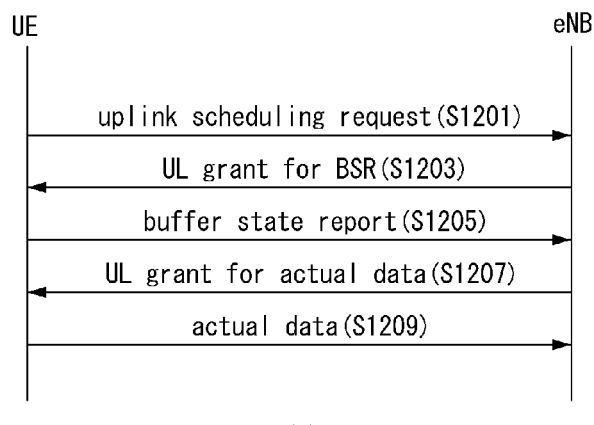
(a)
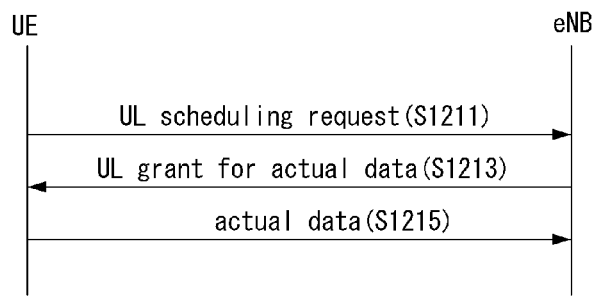
(b)

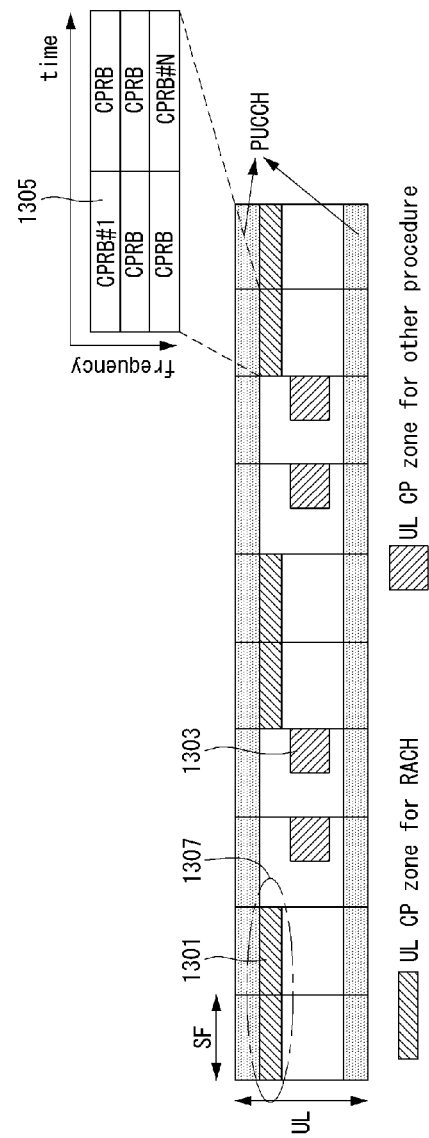
[Fig. 13]

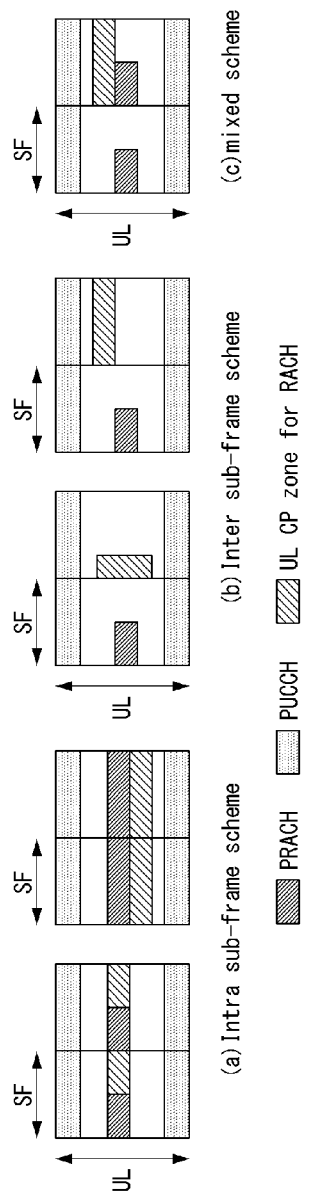

[Fig. 15]
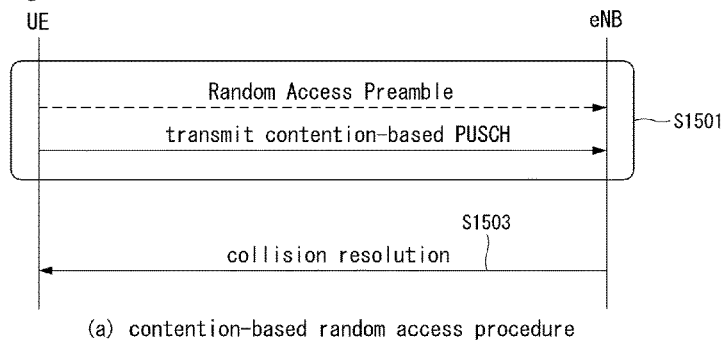
(a) contention-based random access procedure
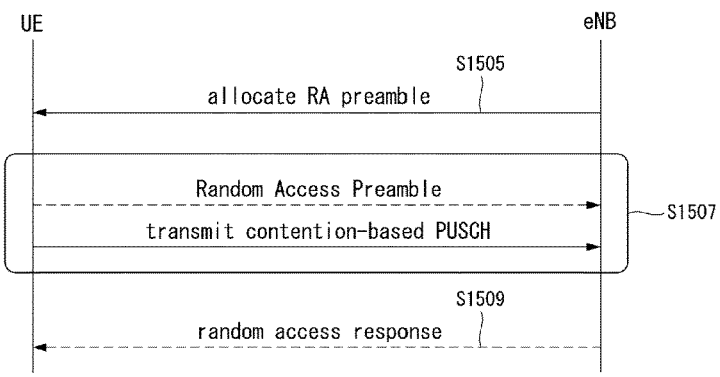
(b) non-contention-based random access procedure
[Fig. 16]
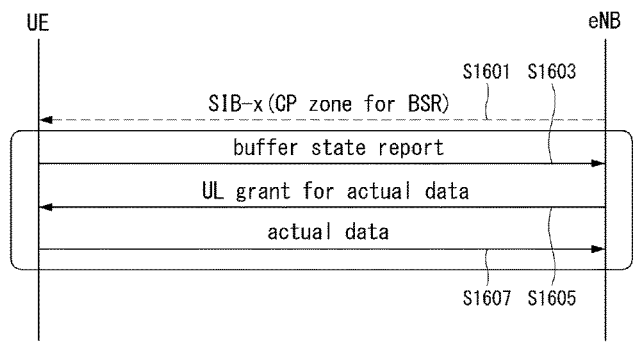
(a) 3-step UL resource allocation procedure
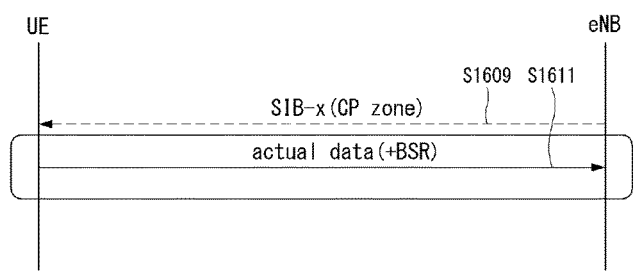
(b) 1-step UL resource allocation procedure

[Fig. 17]
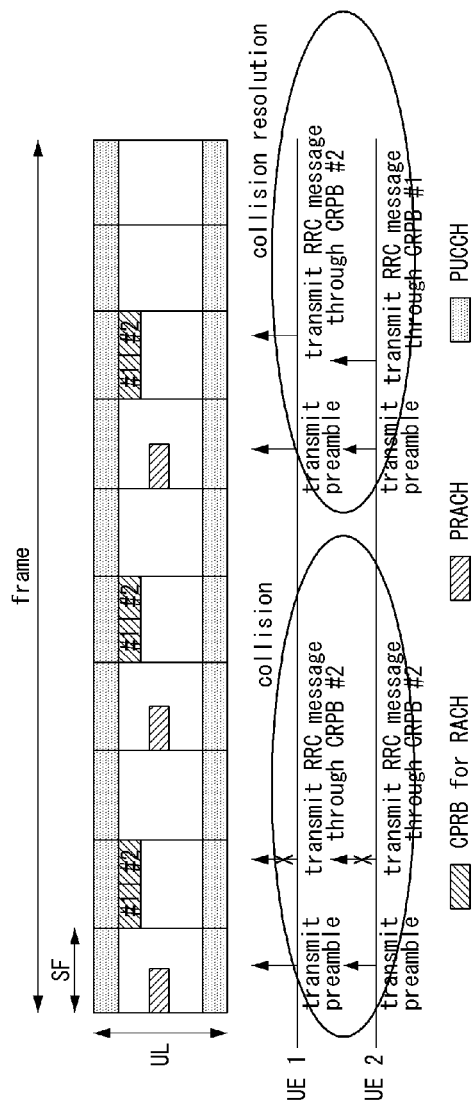

[Fig. 18]
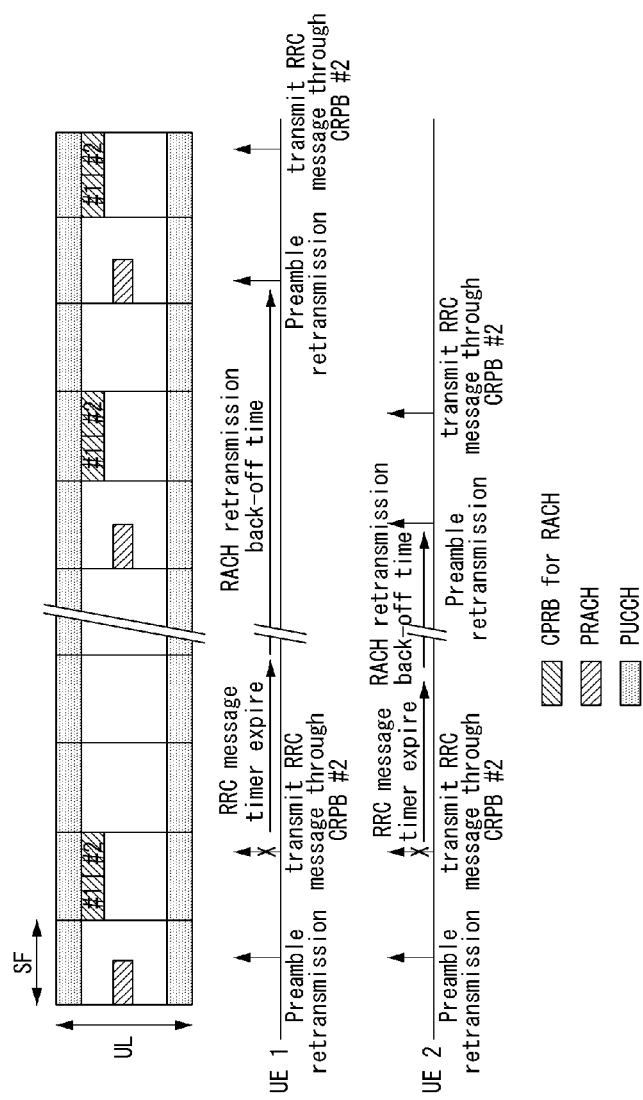

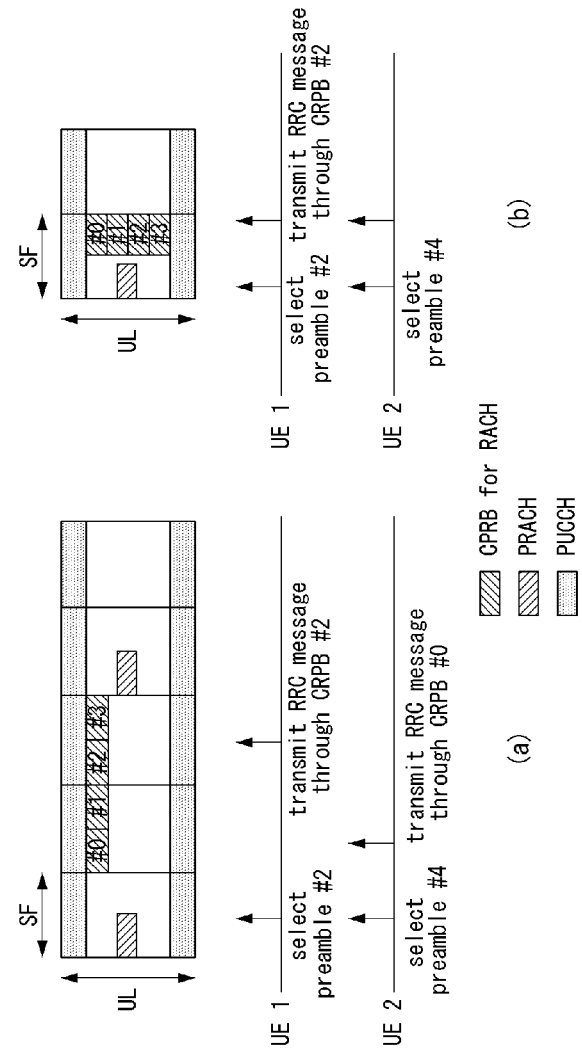
[Fig. 19]

[Fig. 20]
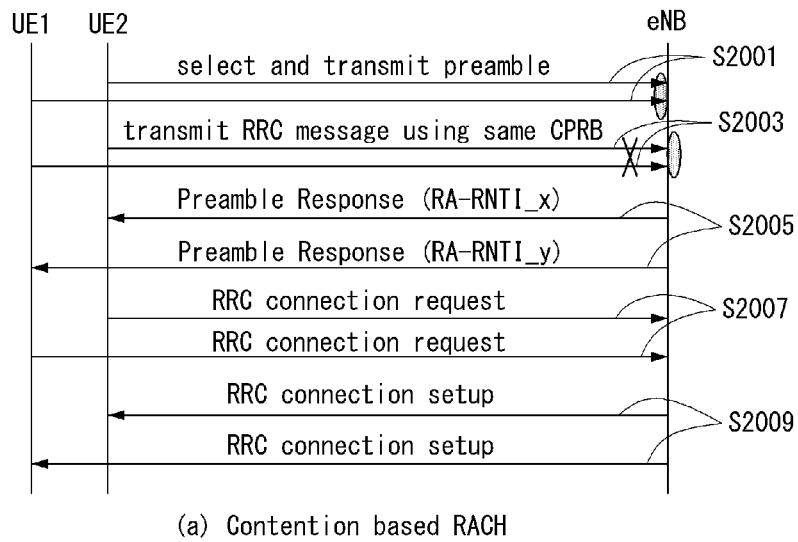
(a) Contention based RACH
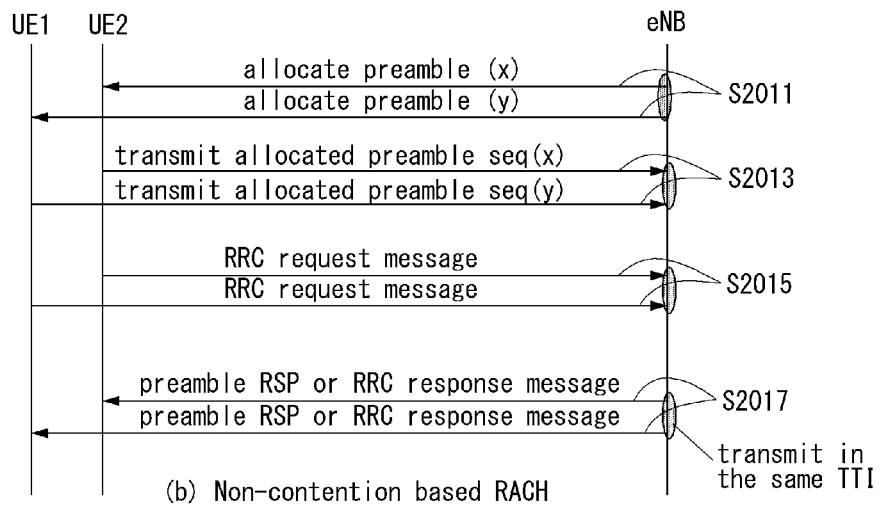
(b) Non-contention based RACH

[Fig. 21]
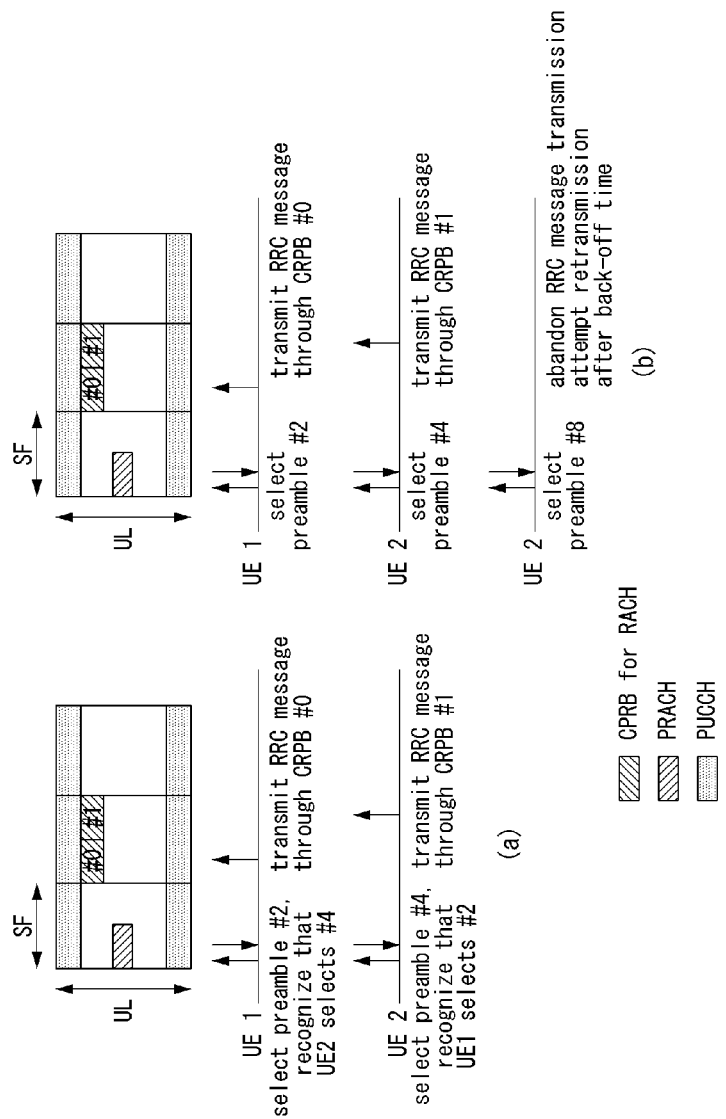

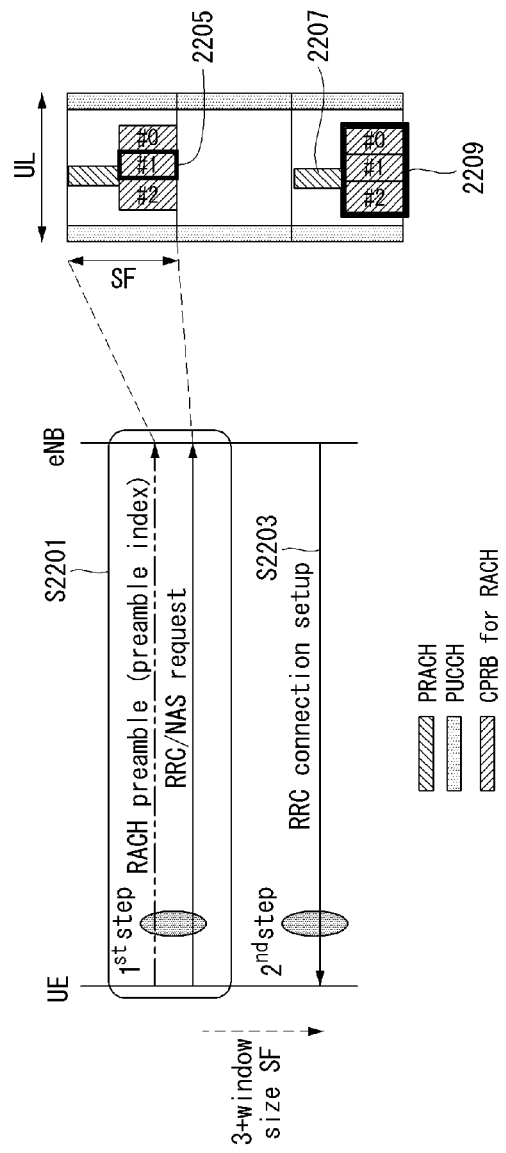
[Fig. 22]

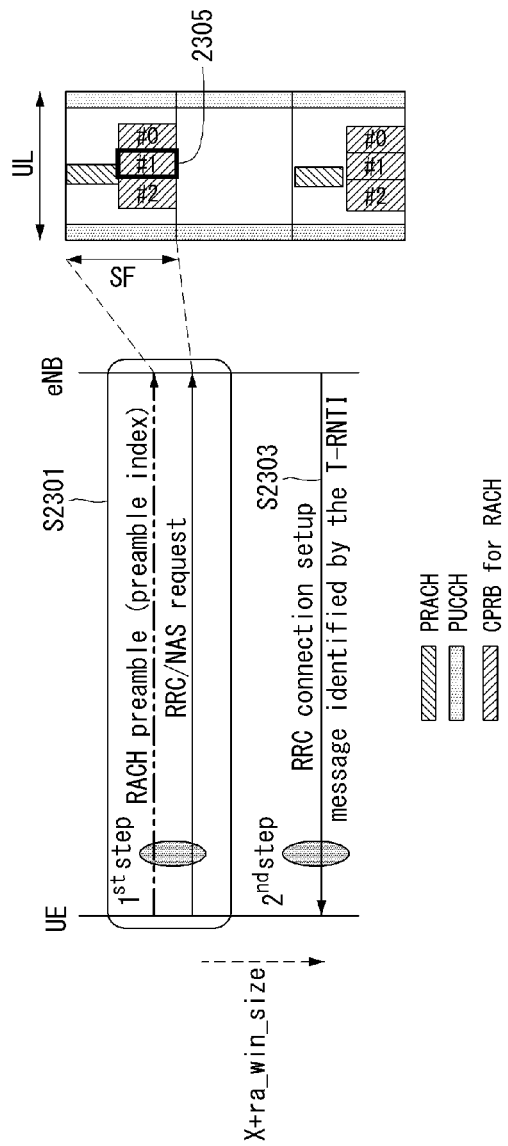

[Fig. 24]
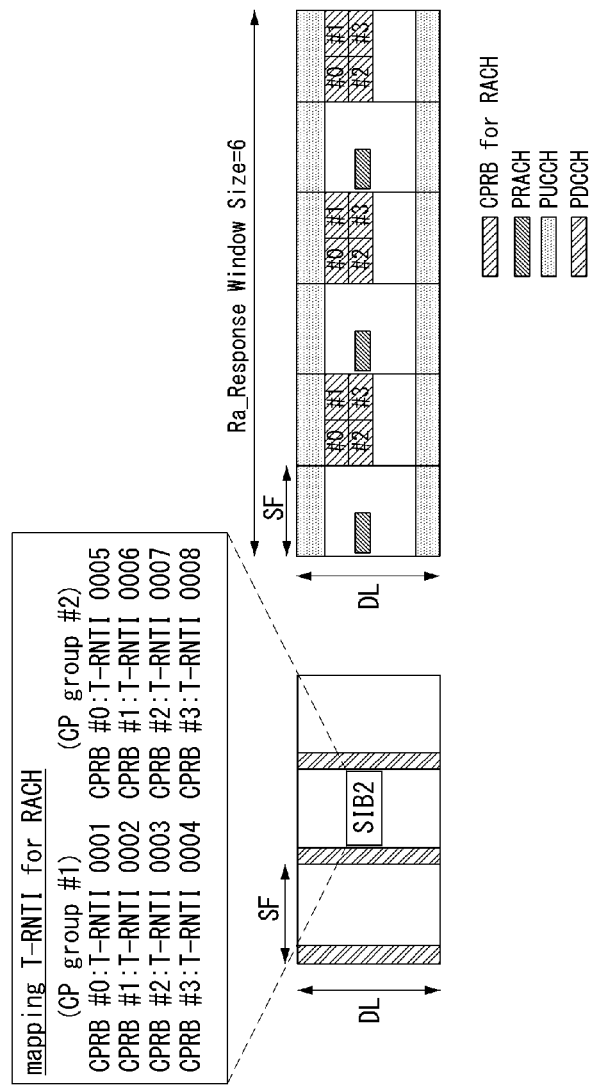

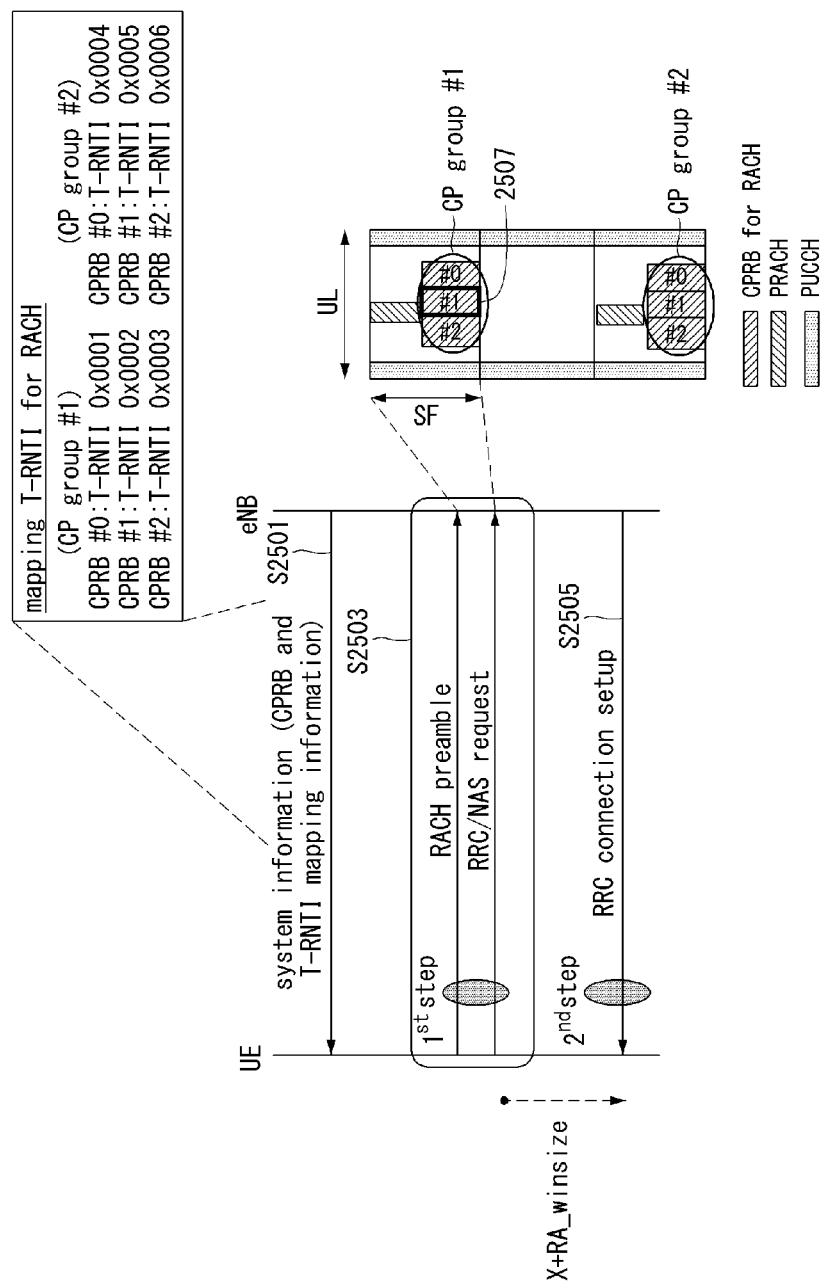
[Fig. 25]

[Fig. 26]
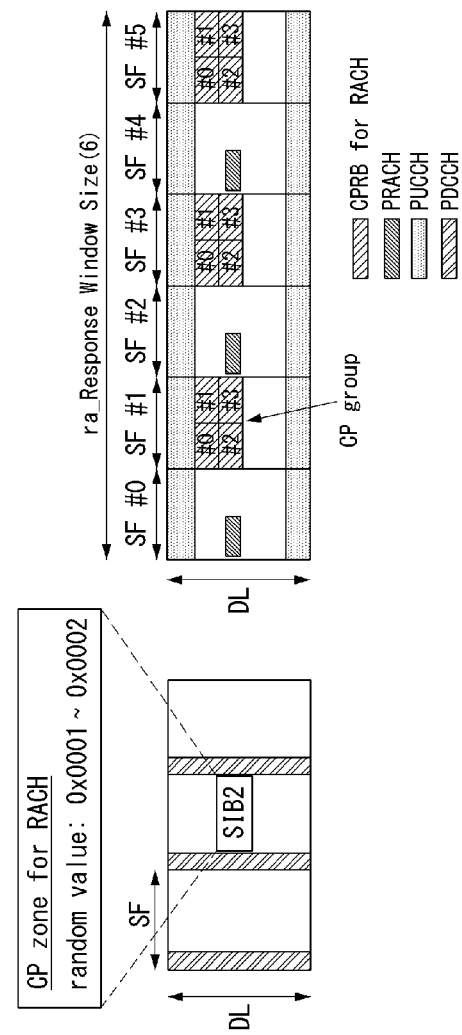

[Fig. 27]
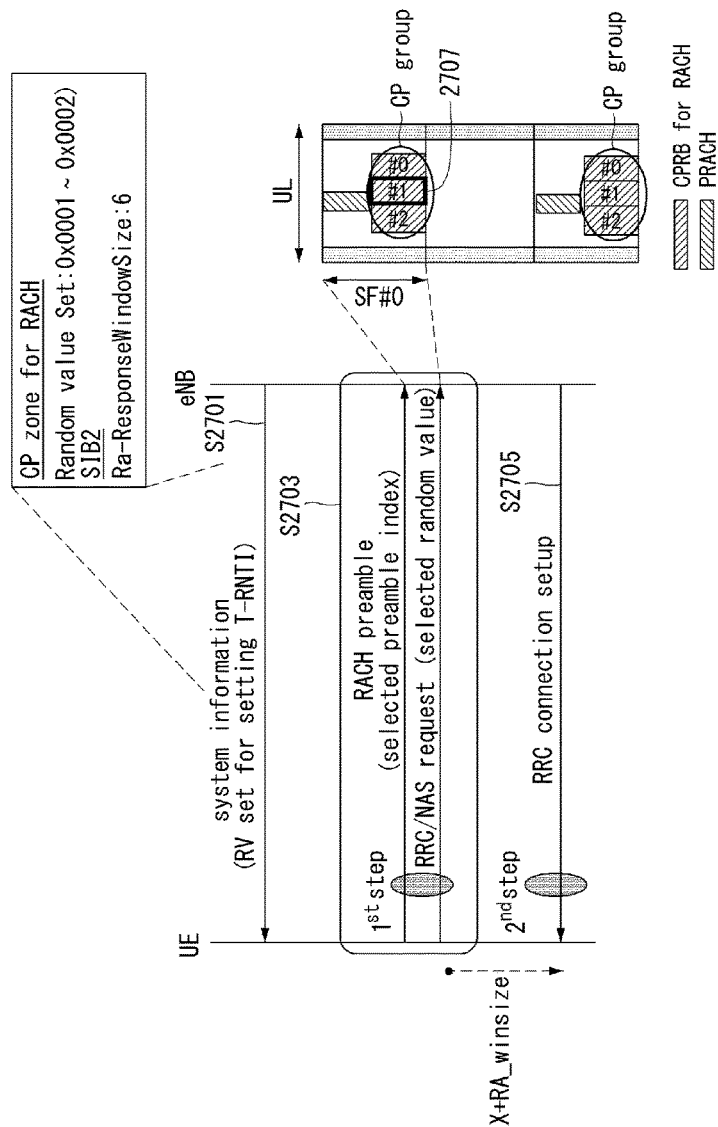
[Fig. 28]
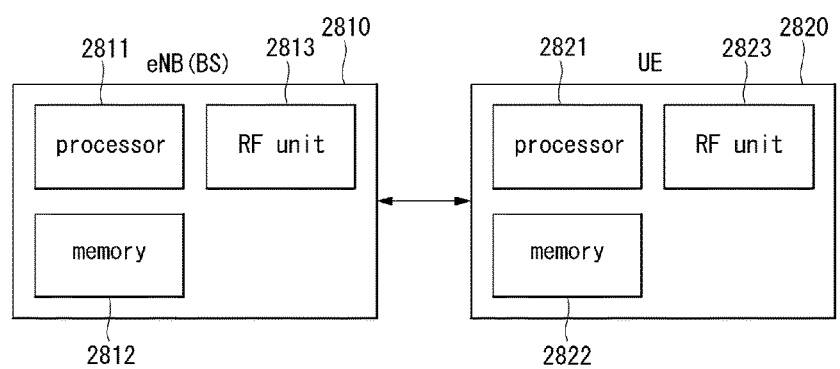

METHOD FOR ALLOCATING TEMPORARY IDENTIFIER TO TERMINAL IN RANDOM ACCESS PROCEDURE IN WIRELESS COMMUNICATION SYSTEM AND APPARATUS THEREFOR

CROSS REFERENCE TO RELATED APPLICATIONS

This application is the National Phase of PCT International Application No. PCT/KR2015/001416, filed on Feb. 12, 2015, which claims priority under 35 U.S.C. 119(e) to U.S. Provisional Application No. 61/951,477, filed on Mar. 11, 2014, all of which are hereby expressly incorporated by reference into the present application.

TECHNICAL FIELD

The present invention relates to a wireless communication system and, more particularly, to a method for allocating a temporary radio network temporary identifier to a terminal performing a random access procedure, and an apparatus supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE OF INVENTION

Technical Problem

In a mobile communication system, in order to maximize resource utilization, a method of transmitting and receiving data through a resource allocation process based on base station scheduling is used. This, however, increases latency of uplink data transmission of a terminal.

In order to solve the foregoing problem, an object of the present invention is to define a contention-based radio resource region in order to minimize latency of a terminal in a wireless communication system.

Also, another object of the present invention is to define 2-step random access procedure in order to minimize latency of the related art 4-step random access procedure.

Also, another object of the present invention is to propose a method for allocating a temporary radio network temporary identifier (T-RNTI) to a terminal in order to accurately transmit and receive transmitted to a terminal in a second step in a case in which the terminal performs the 2-step random access procedure.

The technical problems solved by the present invention are not limited to the above technical problems and those skilled in the art may understand other technical problems from the following description.

Solution to Problem

In an aspect, a method for allocating a temporary radio network temporary identifier (T-RNTI) to a user equipment (UE) within a random access procedure in a wireless communication system, may include: transmitting, by the UE, a random access preamble to a base station (BS); transmitting, by the UE, a radio resource control (RRC) request message to the BS through a contention-based physical uplink shared channel (PUSCH) resource block in which uplink data can be transmitted without uplink resource allocation scheduling; and receiving, by the UE, an RRC connection setup message identified by a T-RNTI allocated to the UE in response to the RRC request message, wherein the T-RNTI is allocated on the basis of the contention-based PUSCH resource block in which the RRC request message has been transmitted.

In another aspect, a user equipment (UE) allocated a temporary radio network temporary identifier (T-RNTI) within a random access procedure in a wireless communication system, may include: a radio frequency (RF) unit and a processor for transmitting and receiving a radio signal, wherein the processor is configured to transmit a random access preamble to a base station (BS), transmit a radio resource control (RRC) request message to the BS through a contention-based physical uplink shared channel (PUSCH) resource block in which uplink data can be transmitted without uplink resource allocation scheduling, receive an RRC connection setup message identified by a T-RNTI allocated to the UE in response to the RRC request message, wherein the T-RNTI is allocated on the basis of the contention-based PUSCH resource block in which the RRC request message has been transmitted.

Preferably, the contention-based PUSCH resource block in which the RRC request message has been transmitted may be selected from among a plurality of candidate contention-based PUSCH resource blocks available to be used by the UE in order to transmit the RRC request message.

Preferably, the T-RNTI may be mapped to the plurality of candidate contention-based PUSCH resource blocks in a one-to-one manner.

Preferably, information regarding mapping between the T-RNTI and the plurality of candidate condition-based PUSCH resource blocks may be transmitted from the BS through a master information block (MIB) or a system information block (SIB).

Preferably, the T-RNTI may be allocated on the basis of a random value selected by the UE and the contention-based PUSCH resource block in which the RRC request message has been transmitted.

Preferably, the random value may be selected from a random set value as a set of random value available to be used by the UE, and information regarding the random set value may be transmitted from the BS through an MIB or an SIB.

Preferably, the RRC request message may include the selected random value.

Preferably, the T-RNTI may be allocated on the basis of a random access-RNTI (RA-RNTI) allocated to the UE and the contention-based PUSCH resource block in which the RRC request message has been transmitted.

Preferably, the RRC request message may be transmitted in the same subframe in which the random access preamble has been transmitted, or in a next subframe.

Advantageous Effects of Invention

According to an embodiment of the present invention, since the 2-step random access procedure is performed, overall latency of an initial access procedure can be minimized, compared with the related art 4-step random access procedure.

Also, according to an embodiment of the present invention, since a T-RNTI of a terminal, which is to be allocated for the second step of the 2-step random access procedure, is shared by the terminal and a base station, the terminal may properly receive an RRC connection setup message that may be transmitted from the base station in the second step.

Also, even though two or more terminals select the same uplink radio resource and transmit an RRC connection request message, the base station can properly receive both data transmitted from the two terminals (for example, when the two terminals are distanced to a degree). In this case, when a method of setting one T-RNTI for particular uplink resource is used, the base station may select only one among the two terminals, whereby only one terminal may complete contention resolution. As a result, even though the base station properly receives the RRC connection request messages from the two or more terminals, the terminal, which is not selected by the base station, should perform RACH (random access channel) procedure again.

However, according to an embodiment of the present invention, since random values randomly selected by terminals are used, even through two or more terminals select the same radio resource, different T-RNTIs may be set for all of the two or more terminals by the randomly selected random values. Thus, when the base station properly receives all of the messages transmitted from two or more terminals, all of the two or more terminals may successfully perform a random access procedure.

The effects of the present invention are not limited to the above-described effects and other effects which are not described herein will become apparent to those skilled in the art from the following description.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 illustrates a schematic structure a network structure of an evolved universal mobile telecommunication system (E-UMTS) to which the present invention can be applied.

FIG. 2 illustrates the configurations of a control plane and a user plane of a radio interface protocol between the E-UTRAN and a UE in the wireless communication system to which the present invention can be applied.

FIG. 3 illustrates physical channels and a view showing physical channels used for in the 3GPP LTE/LTE-A system to which the present invention can be applied.

FIG. 4 is a diagram showing the structure of a radio frame used in a 3GPP LTE system to which the present invention can be applied.

FIG. 5 shows an example of a resource grid for one downlink slot in the wireless communication system to which the present invention can be applied.

FIG. 6 shows a structure of a downlink subframe in the wireless communication system to which the present invention can be applied.

FIG. 7 shows a structure of an uplink subframe in the wireless communication system to which the present invention can be applied.

FIG. 8 is a view illustrating an RRC connection establishment procedure.

FIG. 9 is a view illustrating an operational process of a terminal and a base station in a contention-based random access procedure.

FIG. 10 is a view specifically illustrating an operational process between the terminal and the base station in a non-contention-based random access procedure.

FIG. 11 is a view illustrating delay in each process of the contention-based random access procedure.

FIG. 12 is a view illustrating a process of allocating uplink resource of a terminal.

FIG. 13 is a view illustrating an example of setting contention-based radio resource according to an embodiment of the present invention.

FIG. 14 is a view illustrating an example of setting contention-based radio resource according to an embodiment of the present invention.

FIG. 15 is a view illustrating a random access procedure using contention-based radio resource according to an embodiment of the present invention.

FIG. 16 is a view illustrating an uplink resource allocation procedure using contention-based radio resource according to an embodiment of the present invention.

FIG. 17 is a view illustrating an example in which collision occurs while an RACH procedure using contention-based radio resource according to an embodiment of the present invention.

FIG. 18 is a view illustrating a method for preventing CPRB collision according to an embodiment of the present invention.

FIG. 19 is a view illustrating a method for preventing CPRB collision according to an embodiment of the present invention.

FIG. 20 is a view illustrating a method for solving the collision according to the method of FIG. 19 according to an embodiment of the present invention.

FIG. 21 is a view illustrating a method for preventing CPRB collision according to an embodiment of the present invention.

FIG. 22 is a view illustrating a 2-step random access procedure according to an embodiment of the present invention.

FIG. 23 is a view illustrating a 2-step RACH procedure using a T-RNTI according to an embodiment of the present invention.

FIG. 24 is a view illustrating a method of allocation a T-RNTI in the 2-step RACH procedure according to an embodiment of the present invention.

FIG. 25 is a view illustrating a 2-step RACH procedure using a T-RNTI according to an embodiment of the present invention.

FIG. 26 is a view illustrating a method of allocating a T-RNTI in the 2-step RACH procedure according to an embodiment of the present invention.

FIG. 27 is a view illustrating a 2-step RACH procedure using a T-RNTI according to an embodiment of the present invention.

FIG. 28 is a view illustrating a block diagram of a wireless communication device according to an embodiment of the present invention.

MODE FOR THE INVENTION

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term 'eNB' may be replaced with the term 'fixed station', 'base station (BS)', 'Node B', 'base transceiver system (BTS),', 'access point (AP)', etc. The term 'user equipment (UE)' may be replaced with the term 'terminal', 'mobile station (MS)', 'user terminal (UT)', 'mobile subscriber station (MSS)', 'subscriber station (SS)', 'Advanced Mobile Station (AMS)', 'Wireless terminal (WT)', 'Machine-Type Communication (MTC) device', 'Machine-to-Machine (M2M) device', 'Device-to-Device (D2D) device', wireless device, etc.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink LTE-A is an evolution of 3GPP LTE.

For clarity, this application focuses on the 3GPP LTE/LTE-A system. However, the technical features of the present invention are not limited thereto.

General System to which the Present Invention may be Applied

FIG. 1 illustrates a schematic structure a network structure of an evolved universal mobile telecommunication system (E-UMTS) to which the present invention can be applied.

An E-UMTS system is an evolved version of the UMTS system. For example, the E-UMTS may be also referred to as an LTE/LTE-A system. The E-UMTS is also referred to as a Long Term Evolution (LTE) system.

The E-UTRAN consists of eNBs, providing the E-UTRA user plane and control plane protocol terminations towards the UE. The eNBs are interconnected with each other by means of the X2 interface. The X2 user plane interface (X2-U) is defined between eNBs. The X2-U interface provides non guaranteed delivery of user plane packet data units (PDUs). The X2 control plane interface (X2-CP) is defined between two neighbour eNBs. The X2-CP performs following functions: context transfer between eNBs, control of user plane tunnels between source eNB and target eNB, transfer of handover related messages, uplink load management and the like. Each eNB is connected to User Equipments (UEs) through a radio interface and is connected to an Evolved Packet Core (EPC) through an S1 interface. The S1 user plane interface (S1-U) is defined between the eNB and the serving gateway (S-GW). The S1-U interface provides non guaranteed delivery of user plane PDUs between the eNB and the S-GW. The S1 control plane interface (S1-MME) is defined between the eNB and the MME (Mobility Management Entity). The S1 interface performs following functions: EPS (Enhanced Packet System) Bearer Service Management function, NAS (Non-Access Stratum) Signaling Transport function, Network Sharing Function, MME Load balancing Function and the like. The S1 interface supports a many-to-many relation between MMEs/S-GWs and eNBs.

FIG. 2 illustrates the configurations of a control plane and a user plane of a radio interface protocol between the E-UTRAN and a UE in the wireless communication system to which the present invention can be applied.

FIG. 2(a) shows the respective layers of the radio protocol control plane, and FIG. 2(b) shows the respective layers of the radio protocol user plane.

Referring to the FIG. 2, the protocol layers of a radio interface protocol between the E-UTRAN and a UE can be divided into an L1 layer (first layer), an L2 layer (second layer), and an L3 layer (third layer) based on the lower three layers of the Open System Interconnection (OSI) reference model widely known in communication systems. The radio interface protocol is divided horizontally into a physical layer, a data link layer, and a network layer, and vertically into a user plane for data transmission and a control plane for signaling.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The MAC layer of the second layer provides a service to a Radio Link Control (RLC) layer, located above the MAC layer, through a logical channel. The MAC layer plays a role in mapping various logical channels to various transport channels. And, the MAC layer also plays a role as logical channel multiplexing in mapping several logical channels to one transport channel.

The RLC layer of the second layer supports reliable data transmission. The RLC layer performs segmentation and concatenation on data received from an upper layer to play a role in adjusting a size of the data to be suitable for a lower layer to transfer the data to a radio section. And, the RLC layer provides three kinds of RLC modes including a transparent mode (TM), an unacknowledged mode (UM) and an acknowledged mode (AM) to secure various kinds of QoS demanded by each radio bearer (RB). In particular, the AM RLC performs a retransmission function through automatic repeat and request (ARQ) for the reliable data transfer. The functions of the RLC layer may also be implemented through internal functional blocks of the MAC layer. In this case, the RLC layer need not be present.

A packet data convergence protocol (PDCP) layer of the second layer performs a header compression function for reducing a size of an IP packet header containing relatively large and unnecessary control information to efficiently transmit such an IP packet as IPv4 and IPv6 in a radio section having a small bandwidth. This enables a header part of data to carry mandatory information only to play a role in increasing transmission efficiency of the radio section. Moreover, in the LTE/LTE-A system, the PDCP layer performs a security function as well. This consists of ciphering for preventing data interception conducted by a third party and integrity protection for preventing data manipulation conducted by a third party.

A Radio Resource Control (RRC) layer located at the bottom of the third layer is defined only in the control plane and is responsible for control of logical, transport, and physical channels in association with configuration, re-configuration, and release of Radio Bearers (RBs). The RB is a logical path that the second layer provides for data communication between the UE and the E-UTRAN. To accomplish this, the RRC layer of the UE and the RRC layer of the network exchange RRC messages. To Configure of Radio Bearers means that the radio protocol layer and the characteristic of channels are defined for certain service and that each of specific parameters and operating method are configured for certain service. The radio bearer can be divided signaling radio bearer (SRB) and data radio bearer (DRB). The SRB is used as a path for transmission RRC messages in the control plane, and the DRB is used as a path for transmission user data in the user plane.

A Non-Access Stratum (NAS) layer located above the RRC layer performs functions such as session management and mobility management.

One cell of the eNB is set to use a bandwidth such as 1.25, 2.5, 5, 10 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages, and a downlink Shared Channel (DL-SCH) for transmission of user traffic or control messages. User traffic or control messages of a downlink multicast or broadcast service may be transmitted through DL-SCH and may also be transmitted through a downlink multicast channel (MCH). Uplink transport channels for transmission of data from the UE to the network include a Random Access Channel (RACH) for transmission of initial control messages and an uplink SCH (UL-SCH) for transmission of user traffic or control messages.

Logical channels, which are located above the transport channels and are mapped to the transport channels, include a Broadcast Control Channel (BCCH), a Paging Control Channel (PCCH), a Common Control Channel (CCCH), a dedicated control channel (DCCH), a Multicast Control Channel (MCCH), a dedicated traffic channel (DTCH), and a Multicast Traffic Channel (MTCH).

As an downlink physical channel for transmitting information forwarded on an downlink transport channel to a radio section between a network and a user equipment, there is a physical downlink shared channel (PDSCH) for transmitting information of DL-SCH, a physical control format indicator channel (PDFICH) for indicating the number of OFDM symbols used for transmitting a physical downlink control channel (PDCCH), a physical HARQ (hybrid automatic repeat request) indicator channel (PHICH) for transmitting HARQ ACK (Acknowledge)/NACK (Non-acknowledge) as response to UL transmission or a PDCCH for transmitting such control information, as DL grant indicating resource allocation for transmitting a Paging Channel (PCH) and DL-SCH, information related to HARQ, UL grant indicating resource allocation for transmitting a UL-SCH and like that. As an uplink physical channel for transmitting information forwarded on an uplink transport channel to a radio section between a network and a user equipment, there is a physical uplink shared channel (PUCCH) for transmitting information of UL-SCH, a physical random access channel (PRACH) for transmitting RACH information or a physical uplink control channel (PUCCH) for transmitting such control information, which is provided by first and second layers, as HARQ ACK/NACK (Non-acknowledge), scheduling request (SR), channel quality indicator (CQI) report and the like.

The NAS state model is based on a two-dimensional model which consists of EPS Mobility Management (EMM) states and of EPS Connection Management (ECM) states. The EMM states describe the mobility management states that result from the mobility management procedures e.g., Attach and Tracking Area Update procedures. The ECM states describe the signaling connectivity between the UE and the EPC.

In detail, in order to manage mobility of a UE in NAS layers positioned in control planes of the UE and an MME, an EPS mobility management REGISTERED (EMM-REGISTERED) state and an EMM-DEREGISTERED state may be defined. The EMM-REGISTERED state and the EMM-DEREGISTERED state may be applied to the UE and the MME.

The UE is in the EMM deregistered state, like a state in which power of the UE is first turned on, and in order for the UE to access a network, a process of registering in the corresponding network is performed through an initial access procedure. When the access procedure is successfully performed, the UE and the MME transition to an EMM-REGISTERED state.

Also, in order to manage signaling connection between the UE and the network, an EPS connection management CONNECTED (ECM-CONNECTED) state and an ECM-IDLE state may be defined. The ECM-CONNECTED state and the ECM-IDLE state may also be applied to the UE and the MME. The ECM connection may include an RRC connection established between the UE and a BS and an S1 signaling connection established between the BS and the MME. The RRC state indicates whether an RRC layer of the UE and an RRC layer of the BS are logically connected. That is, when the RRC layer of the UE and the RRC layer of the BS are connected, the UE may be in an RRC_CONNECTED state. When the RRC layer of the UE and the RRC layer of the BS are not connected, the UE in an RRC_IDLE state.

Here, the ECM and EMM states are independent of each other and when the UE is in EMM-REGISTERED state this does not imply that the user plane (radio and S1 bearers) is established In E-UTRAN RRC_CONNECTED state, network-controlled UE-assisted handovers are performed and various DRX cycles are supported. In E-UTRAN RRC_IDLE state, cell reselections are performed and DRX is supported.

The network may recognize the presence of the UE in the ECM-CONNECTED state by the cell and effectively control the UE. That is, when the UE is in the ECM-CONNECTED state, mobility of the UE is managed by a command from the network. In the ECM-CONNECTED state, the network knows about a cell to which the UE belongs. Thus, the network may transmit and/or receive data to or from the UE, control mobility such as handover of the UE, and perform cell measurement on a neighbor cell.

Meanwhile, the network cannot recognize the presence of the UE in the ECM-idle state and a core network (CN) manages the UE by the tracking area, a unit greater than cell. When the UE is in the ECM-idle state, the UE performs discontinuous reception (DRX) set by the NAS using an ID uniquely assigned in a tracking region. That is, the UE may monitor a paging signal at a particular paging opportunity in every UE-specific paging DRX cycle to receive broadcast of system information and paging information. Also, when the UE is in the ECM-idle state, the network does not have context information of the UE.

Thus, the UE in the ECM-idle state may perform a UE-based mobility-related procedure such as cell selection or cell reselection without having to receive a command from the network. When a location of the UE in the ECM-idle state is changed from that known by the network, the UE may inform the network about a location thereof through a tracking area update (TAU) procedure.

As described above, in order for the UE to receive a general mobile communication service such as voice or data, the UE needs to transition to an ECM-CONNECTED state. The UE is in the ECM-IDLE state like the case in which power of the UE is first turned on. When the UE is successfully registered in the corresponding network through an initial attach procedure, the UE and the MME transition to an ECM-CONNECTED state. Also, in a case in which the UE is registered in the network but traffic is deactivated so radio resource is not allocated, the UE is in an ECM-IDLE state, and when uplink or downlink new traffic is generated in the corresponding UE, the UE and the MME transition to an ECM-CONNECTED state through a service request procedure.

FIG. 3 illustrates physical channels and a view showing physical channels used for in the 3GPP LTE/LTE-A system to which the present invention can be applied.

When a UE is powered on or when the UE newly enters a cell, the UE performs an initial cell search operation such as synchronization with a BS in step S301. For the initial cell search operation, the UE may receive a Primary Synchronization Channel (P-SCH) and a Secondary Synchronization Channel (S-SCH) from the BS so as to perform synchronization with the BS, and acquire information such as a cell ID.

Thereafter, the UE may receive a physical broadcast channel (PBCH) from the BS and acquire broadcast information in the cell. Meanwhile, the UE may receive a Downlink Reference signal (DL RS) in the initial cell search step and confirm a downlink channel state.

The UE which completes the initial cell search may receive a Physical Downlink Control Channel (PDCCH) and a Physical Downlink Shared Channel (PDSCH) corresponding to the PDCCH, and acquire more detailed system information in step S302.

Thereafter, the UE may perform a random access procedure in steps S303 to S306, in order to complete the access to the BS. For the random access procedure, the UE may transmit a preamble via a Physical Random Access Channel (PRACH) (S303), and may receive a message in response to the preamble via the PDCCH and the PDSCH corresponding thereto (S304). In contention-based random access, a contention resolution procedure including the transmission of an additional PRACH (S305) and the reception of the PDCCH and the PDSCH corresponding thereto (S306) may be performed.

The UE which performs the above-described procedure may then receive the PDCCH/PDSCH (S307) and transmit a Physical Uplink Shared Channel (PUSCH)/Physical Uplink Control Channel (PUCCH) (S308), as a general uplink/downlink signal transmission procedure.

Control information transmitted from the UE to the BS is collectively referred to as uplink control information (UCI). The UCI includes hybrid automatic repeat and request acknowledgement/negative-acknowledgement (HARQ ACK/NACK), scheduling request (SR), channel quality information (CQI), preceding matrix indicator (PMI), rank indication (RI), etc. In the embodiments of the present invention, CQI and/or PMI are also referred to as channel quality control information.

In general, although a UCI is periodically transmitted via a PUCCH in the LTE system, this may be transmitted through a PUSCH if control information and traffic data are simultaneously transmitted. In addition, a UCI may be aperiodically transmitted via a PUSCH according to a network request/instruction.

FIG. 4 is a diagram showing the structure of a radio frame used in a 3GPP LTE system to which the present invention can be applied.

In a cellular OFDM radio packet communication system, uplink/downlink data packet transmission is performed in subframe units and one subframe is defined as a predetermined duration including a plurality of OFDM symbols. The 3GPP LTE standard supports a type-1 radio frame structure applicable to frequency division duplex (FDD) and a type-2 radio frame structure applicable to time division duplex (TDD).

According to the FDD scheme, the UL transmission and the DL transmission are performed by occupying different frequency bandwidths. According to the TDD scheme, the UL transmission and the DL transmission are performed on respective times different from each other while occupying the same frequency bandwidth. The channel response in the TDD scheme is substantially reciprocal. This signifies that the DL channel response and the UL channel response are about the same in a given frequency domain. Accordingly, there is a merit that the DL channel response can be obtained from the UL channel response in wireless communication systems based on the TDD. In the TDD scheme, since entire frequency bandwidth is timely divided in the UL transmission and the DL transmission, the DL transmission by an eNB and the UL transmission by a UE may not be performed simultaneously. In the TDD system in which the UL transmission and the DL transmission are distinguished by a unit of subframe, the UL transmission and the DL transmission are performed in different subframes.

FIG. 4(a) shows the structure of the type-1 radio frame. A downlink radio frame includes 10 subframes and one subframe includes two slots in a time domain. A time required to transmit one subframe is referred to as a transmission time interval (TTI). For example, one subframe has a length of 1 ms and one slot has a length of 0.5 ms. One slot includes a plurality of OFDM symbols in a time domain and includes a plurality of resource blocks (RBs) in a frequency domain. In the 3GPP LTE system, since OFDMA is used in the downlink, an OFDM symbol indicates one symbol period. The OFDM symbol may be referred to as an SC-FDMA symbol or symbol period. A RB as a resource allocation unit may include a plurality of consecutive subcarriers in one slot.

The number of OFDM symbols included in one slot may be changed according to the configuration of cyclic prefix (CP). CP includes an extended CP and a normal CP. For example, if OFDM symbols are configured by the normal CP, the number of OFDM symbols included in one slot may be 7. If OFDM symbols are configured by the extended CP, since the length of one OFDM symbol is increased, the number of OFDM symbols included in one slot is less than the number of OFDM symbols in case of the normal CP. In case of the extended CP, for example, the number of OFDM symbols included in one slot may be 6. In the case where a channel state is unstable, such as the case where a UE moves at a high speed, the extended CP may be used in order to further reduce inter-symbol interference.

In case of using the normal CP, since one slot includes seven OFDM symbols, one subframe includes 14 OFDM symbols. At this time, a maximum of three first OFDM symbols of each subframe may be allocated to a physical downlink control channel (PDCCH) and the remaining OFDM symbols may be allocated to a physical downlink shared channel (PDCCH).

FIG. 4(b) shows the structure of the type-2 radio frame. The type-2 radio frame includes two half frames and each half frame includes five subframes, a downlink pilot time slot (DwPTS), a guard period (GP) and an uplink pilot time slot (UpPTS). From among these, one subframe includes two slots. The DwPTS is used for initial cell search, synchronization or channel estimation of a UE. The UpPTS is used for channel estimation of a BS and uplink transmission synchronization of a UE. The GP is used to eliminate interference generated in the uplink due to multi-path delay of a downlink signal between the uplink and the downlink.

The structure of the radio frame is only exemplary and the number of subframes included in the radio frame, the number of slots included in the subframe, or the number of symbols included in the slot may be variously changed.

FIG. 5 shows an example of a resource grid for one downlink slot in the wireless communication system to which the present invention can be applied.

Referring to the FIG. 5, the downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block includes 12?7 resource elements. The resource element on the resource grid may be identified by an index pair (k, 1) in the slot. Here, k (k=0, ..., $N^{RB} \times 12-1$) denotes an index of subcarrier in the frequency domain, and 1(1=0, ..., 6) denotes an index of symbol in the time domain. The number NDL of resource blocks included in the downlink slot depends on a downlink transmission bandwidth determined in a cell.

FIG. 6 shows a structure of a downlink subframe in the wireless communication system to which the present invention can be applied.

Referring to the FIG. 6, a maximum of three OFDM symbols located in a front portion of a first slot in a subframe correspond to a control region to be assigned with control channels. The remaining OFDM symbols correspond to a data region to be assigned with physical downlink shared channels (PDSCHs).

Examples of downlink control channels used in the 3GPP LTE include a physical control format indicator channel (PCFICH), a physical downlink control channel (PDCCH), a physical hybrid-ARQ indicator channel (PHICH), etc. The PCFICH transmitted in a 1st OFDM symbol of a subframe carries information regarding the number of OFDM symbols (i.e., a size of a control region) used for transmission of control channels in the subframe. Control information transmitted over the PDCCH is referred to as downlink control information (DCI). The DCI transmits uplink resource assignment information, downlink resource assignment information, an uplink transmit power control (TPC) command for any UE groups, etc. The PHICH carries an acknowledgement (ACK)/not-acknowledgement (NACK) signal for an uplink hybrid automatic repeat request (HARM). That is, the ACK/NACK signal for uplink data transmitted by a UE is transmitted over the PHICH.

A BS determines a PDCCH format according to DCI to be transmitted to a UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the UE, a random access-RNTI (RA-RNTI) may be masked to the CRC.

FIG. 7 shows a structure of an uplink subframe in the wireless communication system to which the present invention can be applied.

Referring to the FIG. 7, the uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. In case of being indicated from higher layer, UE can simultaneously transmit the PUCCH and the PUSCH.

The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

Hereinafter, an RRC connection establishment procedure will be described.

FIG. 8 is a view illustrating an RRC connection establishment procedure.

Referring to FIG. 8, when power of a terminal in an OFF state is turned on or when a terminal has already performed network searching and discovered a network appropriate for its connection, the terminal should transmit an attach request to an MME using a NAS protocol in order to access the network. Here, in order for the terminal and the MME to exchange an NAS message, a signaling connection, namely, an ECM connection, allowing the NAS messages to be transmitted between the terminal and the MME, should be generated. Namely, the terminal and the MME should transition from an ECM idle state (ECM-IDLE) to an ECM connected state, and this means, from the standpoint of the terminal, that the terminal transitions to the RRC connected state. To this end, the NAS layer of the terminal delivers a NAS attach request to the RRC layer (S801). The attach request in the NAS protocol refers to a message transmitted by the terminal to the MME in order to perform an attach procedure.

When the NAS layer of the terminal requests the RRC connection, the RRC layer of the terminal performs an access barring check process (S803). Here, the access barring check process refers to access class barring (ACB) and/or extended access barring (EAB) process.

A service user may obtain authority to preferentially access a wireless access network by using the ACB mechanism. The ACB mechanism may provide access priority to the terminal on the basis of the allocated access class. In a case in which the service user belongs to any one of particular access classes, the corresponding terminal may preferentially access the network in a congested situation, relative to other terminals. If the terminal is a member of any one access class corresponding to an allowed class and the access class is applicable in a serving network, an access attempt may be allowed. If not, the access attempt is not allowed. Also, even though common access is allowed, the serving network may indicate a limitation that the terminal should perform location registrations. When the terminal responds to paging, the terminal may follow a generally defined process.

In order to perform ABC, the RRC layer of the terminal may obtain ABC information through system information broadcast by a cell. The ABC information may include different barring times and barring factors with respect to different RRC establishment causes. The ABC information may be transmitted in a system information block (SIB) 2. When the NAS layer of the terminal requests RRC connection, the RRC layer of the terminal performs ABC using a barring time and a barring factor corresponding to the RRC establishment cause. When performing ABC, the RRC layer of the terminal may generate a certain value and compare the generated value with the barring factor. According to whether the generated certain value is greater or smaller than the barring factor, the RRC layer of the terminal may determine whether to perform barring. When barring is performed, the terminal cannot transmit an RRC connection request message for a barring duration.

EAB is a mechanism for controlling mobile originating access attempts of terminals set to perform EAB in order to for an operator to prevent overload of an access network and/or a core network. In a congested situation, the operator may limit access of terminals set to perform EAB. The terminals set to perform EAB may be those that are less vulnerable to a time delay than other terminals. For example, EAB may be performed on a machine-type communication (MTC) device as a terminal used for MTC, i.e. machine-to-machine communication without intervention of a human being. In detail, when the operator determines that it is appropriate to apply EAB, the network broadcasts EAB information to terminals within a particular region. When a terminal set to perform EAB is present within the cell that broadcasts the EAB information, the terminal may perform EAB through an RRC layer of the terminal according to requested from a NAS layer of the terminal. The RRC layer of the terminal may first perform EAB before performing ACB, and when the terminal has passed the EAB, the terminal performs AC.

When access is not barred according to the result of performing the access barring check process in step S803 (namely, when the terminal has passed ACB and/or EAB, the RRC layer of the terminal delivers an RRC connection request message to lower layers (namely, PDCP/RLC/MAC/L1 layers) of the terminal (S805), and the RRC connection request message and an RRC connection setup message are transmitted or received through a random access procedure (or RACH procedure) (S807).

The random access procedure may include (1) a step in which the terminal transmits a random access preamble to the BS (hereinafter, referred to as a "first message (Msg1)" transmission step), (2) a step in which a random access response is received from the BS in response to the transmitted random access preamble (hereinafter, referred to as a "second message (Msg2)" reception step), (3) a step in which an uplink message is transmitted by using information received in the random access response message (hereinafter, referred to as a "third message (Msg3)" transmission step), and (4) a step in which a message corresponding to the uplink message is received from the BS (hereinafter, referred to as a "fourth message (Msg4)" reception step). An uplink resource allocation (UL grant) for the RRC connection request message is transmitted in a random access response message, and the RRC connection request message is included in a third message (message 32) of the random access procedure and transmitted. The RRC connection setup message may correspond to a fourth message (message 4) of the random access procedure.

The RRC connection request message may include a terminal identity (e.g., an SAE-temporary mobile subscriber identity (S-TMSI) or a random ID and an establishment cause). The establishment cause is determined according to an NAS procedure (e.g., attach, detach, tracking area update, service request, service request, and extended service request). Since both the DCCH and the SRB1 are not set currently, the RRC connection request message is delivered to the BS through a CCCH/UL-SCH/PUSCH using SRB 0.

The RRC connection setup message includes configuration information for setting SRB1, and by transmitting the RRC connection setup message to the terminal, the BS allocates SRB (e.g., SRB 1) configuration resource to be dedicatedly used by the terminal. The terminal, which has successively completed the random access and allocated the C-RNTI, monitors a PDCCH using the C-RNTI, and the PDCCH indicates a PDSCH resource block transmitting an RRC connection setup message. The RRC connection setup message is delivered to the terminal through CCCH/DL-SCH/PDSCH using SRB0.

A control signal between the BS and the MME is transmitted through an S1AP message in an S1-MME interface. The S1AP message is transmitted through S1 signaling connection by user, and the S1 signaling connection is defined by an identity pair (namely, eNB UE S1AP ID and MME UE S1AP ID) allocated to identify a terminal by the BS and the MME. In a state in which S1 signaling connection is not established, when an attach request message as an initial NAS message is received, the BS allocates an identity (namely, eNB UE S1AP ID) to set up S1 signaling connection and transmits a NAS attach request message to the MME (S809).

When the attach request message is received from the BS through S1-MME, the MME allocates an identity (e.g., MME S1AP UE ID) to the corresponding terminal, thereby setting up S1 signaling connection between the BS and the MME (i.e., eNB UE S1AP ID, MME UE S1AP ID).

The lower layers of the terminal (i.e., PDCP/RLC/MAC/L1 layers) deliver the RRC connection setup message to the RRC layer (S811), the RRC layer of the terminal sets SRB 1 by using the SRB configuration allocated through the RRC connection setup message (S813) Upon receiving the RRC connection setup message, the terminal transitions to an RRC connected state.

Subsequently, in order to complete the RRC connection establishment procedure, the RRC layer of the terminal delivers an RRC connection setup complete message to the lower layers (i.e., PDCP/RLC/MAC/L1 layers) of the terminal (S815), and by transmitting the RRC connection setup message to the BS through the lower layers, the terminal informs the BS about the RRC connection completion (S817). The terminal includes a NAS attach request message in the RRC connection setup complete message and transmits the same to the BS, and the BS may extract the NAS attach request message from the RRC connection setup complete message, and transmit the extracted NAS attach request message to the MEM by using an S1AP message. The RRC connection setup complete message is transmitted through a set SRB1 and a DCCH.

Meanwhile, in a case in which the terminal has been registered in the network but traffic is deactivated and radio resource is not allocated, the terminal is in an ECM idle state, and when new uplink traffic to be transmitted to the network occurs, the terminal should transmit a service request to the MME by using a NAS protocol. Also, in this case, an ECM connection (RRC connection from the standpoint of the terminal) should be generated between the terminal and the MME and this means that the terminal should transitions to an EMM registered state. Thus, in order to transition to the ECM connection state, the terminal performs the RRC connection establishment procedure described above.

Hereinafter, a random access procedure provide in an LTE/LTE-A system will be described.

A random access procedure is used for the terminal to obtain uplink synchronization with the BS or to be allocated uplink radio resource. After power of the terminal is turned on, the terminal obtains downlink synchronization with an initial cell and receives system information. The terminal obtains an aggregation of available random access preambles and information regarding radio resource used for transmission of the random access preambles from the system information. The radio resource used for transmission of the random access preambles may be specified by a combination of at least one subframe index and an index of a frequency domain. The terminal transmits a random access preamble randomly selected from the aggregation of the random access preambles, and upon receiving the random access preamble, the BS transmits a timing alignment (TA) value for uplink synchronization to the terminal through a random access response. Accordingly, the terminal obtains uplink synchronization.

The random access procedure is a procedure common to frequency division duplex (FDD) and time division duplex (TDD). The random access procedure is unrelated to a cell size and, when carrier aggregation (CA) is set, the random access procedure is unrelated to the number of serving cells.

First, the terminal may perform the random access procedure in the following cases.

When the terminal performs initial accessing in an RRC idle state without an RRC connection When the terminal performs an RRC connection re-establishment procedure When the terminal fist accesses a target cell during a handover process.

When the random access procedure is requested according to a command from the BS.

When data to be transmitted to downlink is generated in a non-synchronized state during RRC connection When data to be transmitted to uplink is generated in a non-synchronized state during RRC connection or radio resource designated to be used for requesting radio resource is not allocated, When positioning of the terminal is performed in a state in which timing advance is required.

When a recovery process is performed due to radio link failure or handover failure.

Meanwhile, a communication environment considered in the embodiments of the present invention includes a carrier system or carrier aggregation (CA), and this refers to a system of aggregating one or more component carriers (CC) having a bandwidth smaller than a target band and using the same in configuring a target wide band. Carrier aggregation refers to aggregation of non-contiguous carriers as well as aggregation of contiguous carriers. Also, the numbers of component carriers aggregated between downlink and uplink may be set to be different. A case in which the number of downlink component carriers (DL CCs) and the number of uplink component carriers (UL CCs) are the same is called symmetric aggregation, and a case in which the numbers are different is called asymmetric aggregation. The carrier aggregation may be mixedly used together with terms such as bandwidth aggregation, spectrum aggregation, and the like.

In the LTE-A system, a concept of cell is used to manage radio resource. The foregoing carrier aggregation environment may be called a multi-cell environment. A cell may be defined as a combination of a pair of DL CC and an UL CC, but ULCC is not essential. Thus, a cell may be composed of DL CC alone or a DL CC and a UL CC. In a case in which a particular terminal has a single configured serving cell, the terminal may have one DL CC and one UL CC, but when a particular terminal has two or more configured serving cells, the terminal may have DL CCs equal to the number of cells, and here, the number UL CCs may be equal to or smaller than the number of DL CCs. Alternatively, the number of DL CCs and the number of UL CCs may be configured reversely. Namely, in a case in which a particular terminal has a plurality of configured serving cells, a carrier aggregation environment in which the number of UL CCs is greater than the number of DL CCs may also be supported. Namely, carrier aggregation may be understood as aggregation of two or more cells having different carrier frequencies (central frequencies of cells). The "cell" mentioned here should be distinguished from a generally used"cell" as a region covered by a BS.

The cell used in the LTE-A system includes a primary cell (Pcell) and a secondary cell (Scell). A Pcell refers to a cell operating in a primary frequency (or primary CC (PCC)). The Pcell may be used when a terminal performs an initial connection establishment procedure or performs a connection reestablishment process, and may also refer to a cell indicated during a handover process. Also, the Pcell refers to a cell as a center of control-related communication among serving cells configured in a CA environment. Namely, the terminal may be allocated a PUCCH only in its Pcell and transmit the same, and may use only Pcell to obtain system information or change a monitoring procedure. The Scell may refer to a cell operating in a secondary frequency (SCC). Only one Pcell is allocated to a particular terminal and one or more Scells may be allocated thereto. The Scell may be configured after an RRC connection is established, and may be used to provide additional radio resource. Among serving cells configured in the CA environment, PUCCH may not be present in cells, i.e., S cells, other than a Pcell.

3GPP Rel-10 considers that a timing advance (TA) value applicable to a single particular cell (e.g., Pcell) is commonly applied to a plurality of cells in a wireless access system supporting CA. In this case, however, a plurality of cells belonging to different frequency bands (namely, cells significantly distanced in frequency) or a plurality of cells having different propagation characteristics may be aggregated. Also, in case of a particular cell, in a situation in which small cells such as a remote radio header (RRH) (i.e., a repeater), a femto cell, or a pico cell, or a secondary BS (SeNB) are disposed in a cell, when the terminal communicates with a BS (i.e., a macro eNB) through one cell and communicates with a secondary cell through a different cell, the plurality of cells may have different propagation delay characteristics. In this case, if uplink transmission used as a scheme of commonly applying a TA value to a plurality of cells is performed, synchronization of uplink signals transmitted in the plurality of cells may be severely affected. Thus, it may be preferred to have a plurality of TAs in a CA situation in which a plurality of cells are aggregated, and 3GPP Rel-11 considers independently allocation of a TA by particular cell group. This is called a TA group (TAG), and TAG may include one or more cells and the same TA may be commonly applied to one or more cells included in the TAG. In order to support the multiple TAs, a MAC TA command control element includes 2-bit TAG identity (TAG ID) and 6-bit TA command field.

When a case of performing the random access procedure described above in relation to the Pcell occurs, a CA-set terminal performs the random access procedure. In case of a TAG to which the Pcell belongs (i.e., primary TAG (pTAG)), a TA determined with respect to the Pcell in the same manner as that of the existing case or adjusted through a random access procedure entailed in the Pcell may be applied to all the cell(s) of the pTAG. Meanwhile, in case of a TAG including only S cells (i.e., secondary TAG (sTAG)), a TA determined with respect to a particular S cell of the sTAG may be applied to all the cell(s) of the corresponding sTAG, and here, the TA may be obtained through the random access procedure initiated by the BS. In detail, an S cell in the sTAG is configured with RACH resource, and in order to determine the TA, the BS requests RACH access from Scells. Namely, the BS initiates RACH transmission in Scells according to PDCCH order transmitted from the Pcell. A response message with respect to a Scell preamble is transmitted through the Pcell by using an RA-RNTI. The terminal may apply a TA determined with respect to an Scell which has successfully finished random access to all the cell(s) of the corresponding sTAG. In this manner, the random access procedure may also be performed even in the S cells in order to obtain TA of the sTAG to which the corresponding Scells belong.

The LTE/LTE-A system provides both a contention based random access procedure in which a terminal randomly selects a preamble and uses in a particular aggregation and a non-contention based random access procedure in which the terminal uses a random access preamble allocated only thereto by a BS, during a process of selecting a random access preamble (RACH preamble). However, the non-contention based random access procedure may be used limitedly only in positioning a terminal and/or a timing advance alignment for sTAG when the foregoing handover process is performed or when requested according to a command from the BS. After the random access procedure is completed, a general uplink/downlink transmission occurs.

Meanwhile, a relay node (RN) also supports both the contention based random access procedure and the non-contention based random access procedure. When the RN performs the random access procedure, it suspends RN subframe configuration at the time. Namely, this means that the RN subframe configuration is temporarily discarded. Thereafter, the RN subframe configuration may be resumed at a point in time at which the random access procedure is completed.

FIG. 9 is a diagram for describing the contention-based random access procedure in the wireless communication system to which the present invention can be applied.

(1) First message (Msg 1, message 1)

First, the terminal randomly selects one random access preamble (RACH preamble) from an set of random access preambles indicated through system information or a handover command, and selects physical RACH (PRACH) resource for transmitting the random access preamble, and transmits the same. The terminal sets transmission power of the random access preamble (PREAMBLE_RECEIVED_TARGET_POWER) to ('preambleInitialReceivedTargetPower'+'DELTA_PREAMBLE'+('PREAMBLE_TRANSMISSION_COUNTER'? 1)*'powerRampingStep'), and transmits the same. Here, "preambleInitialReceivedTargetPower" indicate initial transmission power, and "DELTA_PREAMBLE" indicates a power offset value according to a preamble format. "PREAMBLE_TRANSMISSION_COUNTER" indicates the number of preamble transmissions. "powerRampingStep" indicates a power ramping factor. These values are signaled as part of system information to the terminal.

When the random access preamble is received from the terminal, the BS decodes the preamble and obtains an RA-RNTI. The RA-RNTI related to the PRACH in which the random access preamble has been transmitted is determined as expressed by Equation 1 below according to time-frequency resource of the random access preamble transmitted by the corresponding terminal.

MathFigure 1

$$\text{RA-RNTI}=1+t_{id}+10*f_{id} \qquad [\text{Math.1}]$$

In Equation 1, t_id denotes an index of a first subframe ($0 \le t\_id < 10$), and f_id denotes an index of the PRACH in ascending order in the frequency domain of the subframe ($0 \le f\_id < 6$).

(2) Message 2 (Msg 2)

The eNB transmits the random access response that is addressed to RA-RNTI that is acquired through the preamble on the Msg 1 to the UE. The random access response may include RA preamble index/identifier, UL grant that informs the UL radio resource, temporary C-RNTI (TC-RNTI), and time alignment command (TAC). The TAC is the information indicating a time synchronization value that is transmitted by the eNB in order to maintain the UL time alignment. The UE updates the UL transmission timing using the time synchronization value. On the update of the time synchronization value, the UE initiates or restarts the time alignment timer. The UL grant includes the UL resource allocation that is used for transmission of the scheduling message to be described later (Message 3) and the transmit power command (TPC). The TCP is used for determination of the transmission power for the scheduled PUSCH.

The UE, after transmitting the random access preamble, tries to receive the random access response of its own within the random access response window that is instructed by the eNB with system information or handover command, detects the PDCCH masked with RA-RNTI that corresponds to PRACH, and receives the PDSCH that is indicated by the detected PDCCH. The random access response information may be transmitted in a MAC PDU and the MAC PDU may be delivered through PDSCH. It is desirable to include the information of UE that is to receive the PDSCH, frequency and the time information of the PDSCH radio resource, and transmission type of the PDSCH, etc in the PDCCH. As described above, if succeeding in detecting the PDCCH that is transmitted to the UE itself, the UE may receive properly the random access response that is transmitted to the PDSCH according to the PDCCH information.

The RNTI is a unique identity given to a terminal and a value thereof may be determined according to a position in which the corresponding RNTI is generated. The RNTI includes C-RNTI(cell RNTI), M-RNTI(MBMS(multimedia broadcast multicast service) RNTI), P-RNTI(paging RNTI), RA-RNTI(random access RNTI), SI-RNTI(system information RNTI), TPC-PUCCH-RNTI(transmit power control-PUCCH-RNTI), and TPC-PUSCH-RNTI (transmit power control-PUSCH-RNTI). A terminal may decode a PDCCH with different periods according to types of the RNTI. For example, an S-RNTI may be configured to be attempted to be detected with a long period, and a C-RNTI may be configured to be attempted to be detected with a short period. By using different detection periods according to types, an unnecessary detected process of a terminal may be reduced and an increase in latency may be effectively prevented. The configuration has been described by a detection period of a terminal for the purposes of description, but the use of an allocation period of a BS is no different.

The terminal uses the same C-RNTI in every serving cell. Table 1 shows a specific example of RNTI values according to 3GPP LTE-A standard.

TABLE 1

| Value (hexa-decimal) | RNTI |
| --- | --- |
| 0000 | N/A |
| 0001-003C | RA-RNTI, C-RNTI, Semi-Persistent Scheduling C-RNTI, Temporary C-RNTI, TPC-PUCCH-RNTI and TPC-PUSCH-RNTI (see note) |
| 003D-FFF3 | C-RNTI, Semi-Persistent Scheduling C-RNTI, Temporary C-RNTI, TPC-PUCCH-RNTI and TPC-PUSCH-RNTI |

TABLE 1-continued

| Value (hexa-decimal) | RNTI |
| --- | --- |
| FFF4-FFFC | Reserved for future use |
| FFFD | M-RNTI |
| FFFE | P-RNTI |
| FFFF | SI-RNTI |

Table 2 shows transport channels and logical channels related to the detailed description of the RNTIs according to the 3GPP LTE-A standard.

TABLE 2

| RNTI | Usage | Transport Channel | Logical Channel |
| --- | --- | --- | --- |
| P-RNTI | Paging and System Information change notification | PCH | PCCH |
| SI-RNTI | Broadcast of System Information | DL-SCH | BCCH |
| M-RNTI | MCCH Information change notification | N/A | N/A |
| RA-RNTI | Random Access Response | DL-SCH | N/A |
| Temporary C-RNTI | Contention Resolution (when no valid C-RNTI is available) | DL-SCH | CCCH |
| Temporary C-RNTI | Msg3 transmission | UL-SCH | CCCH, DCCH, DTCH |
| C-RNTI | Dynamically scheduled unicast transmission | UL-SCH | DCCH, DTCH |
| C-RNTI | Dynamically scheduled unicast transmission | DL-SCH | CCCH, DCCH, DTCH |
| C-RNTI | Triggering of PDCCH ordered random access | N/A | N/A |
| Semi-Persistent Scheduling C-RNTI | Semi-Persistently scheduled unicast transmission (activation, reactivation and retransmission) | DL-SCH, UL-SCH | DCCH, DTCH |
| Semi-Persistent Scheduling C-RNTI | Semi-Persistently scheduled unicast transmission (deactivation) | N/A | N/A |
| TPC-PUCCH-RNTI | Physical layer Uplink power control | N/A | N/A |
| TPC-PUSCH-RNTI | Physical layer Uplink power control | N/A | N/A |

The random access response window represents the maximum time section when the UE that has transmitted the preamble is waiting for the random access response message. The random access response window has the length of 'ra-ResponseWindowSize', which starts from the subframe after 3 subframes from the last subframe in which the preamble is transmitted. That is, the UE is waiting for receiving the random access response during the random access window secured after 3 subframes from the subframe in which the preamble transmission was completed. The UE may acquire the random access window size ('ra-ResponseWindowsize') parameter value through the system information, and the random access window size may be determined as a value from 2 to 10.

The UE terminates monitoring of the random access response if successfully receiving the random access response having the random access preamble index/identifier same as the random access preamble that is transmitted to the eNB. Meanwhile, if the random access response message has not been received until the random access response window is terminated, or if not received a valid random access response having the random access preamble index same as the random access preamble that is transmitted to the eNB, it is considered that the receipt of random access response is failed, and after that, the UE may perform the retransmission of preamble.

As described above, the reason why the random access preamble index is needed in the random access response is that one random access response may include the random access response information for one or more UEs, and so there is required an index to instruct for which UE the above UL grant, TC-RNTI, and TAC are available.

(3) Message 3 (Msg 3)

In case that the UE receives the random access response that is effective with the UE itself, the UE processes the information included in the random access response respectively. That is, the UE applies TAC and stores TC-RNTI. Also, by using UL grant, the UE transmits the data stored in the buffer of UE or the data newly generated to the eNB. In case of the initial access of UE, the RRC connection request that is delivered through CCCH after generating in RRC layer may be transmitted with being included in the message 3. In case of the RRC connection reestablishment procedure, the RRC connection reestablishment request that is delivered through CCCH after generating in RRC layer may be transmitted with being included in the message 3. Additionally, NAS access request message may be included.

The message 3 should include the identifier of UE. In the content based random access procedure, the eNB may not identify which UEs perform the random access procedure, but the eNB is required to identify the UE in order to solve the collision later on.

There are two ways how to include the identifier of UE. The first method is that the UE transmits the C-RNTI of its own through the UL transmission signal corresponding to the UL grant, if the UE has a valid C-RNTI that is already allocated by the relevant cell before the random access procedure. Meanwhile, if the UE has not been allocated a valid C-RNTI before the random access procedure, the UE transmits including unique identifier of its own (for example, S-TMSI or random number). Normally the above unique identifier is longer than C-RNTI. For the transmission on the UL SCH, the UE-specific scrambling is used. However, if the UE has not been allocated C-RNTI yet, the scrambling is not based on the C-RNTI but uses TC-RNTI that is received from the random access response instead. If transmitting the data corresponding to the UL grant, the UE initiates a contention resolution timer.

(4) Message 4 (Msg 4)

The eNB, in case of receiving the C-RNTI of corresponding UE through the message 3 from the UE, transmits the message 4 to the UE by using the received C-RNTI. Meanwhile, in case of receiving the unique identifier (that is, S-TMSI or random number) through the message 3 from the UE, the eNB transmits the 4 message to the UE by using the TC-RNTI that is allocated from the random access response to the relevant UE. Herein, the 4 message may correspond to the RRC connection setup message including C-RNTI.

The UE waits for the instruction of eNB in order to resolve contention after transmitting the data including the identifier of its own through the UL grant included the random access response. That is, the UE attempts the receipt of PDCCH in order to a specific message. There are two ways how to receive the PDCCH. As previously mentioned, in case that the message 3 transmitted in response to the UL grant includes C-RNTI as an identifier of its own, the UE attempts the receipt of PDCCH using the C-RNTI of itself, and in case that the above identifier is the unique identifier (that is, S-TMSI or random number), the UE tries to receive PDCCH using the TC-RNTI that is included in the random access response. After that, in the former case, if the PDCCH is received through the C-RNTI of its own before the contention resolution timer is terminated, the UE determines that the random access procedure has been completed and terminates the procedure. In the latter case, if the PDCCH is received through the TC-RNTI before the contention resolution timer is terminated, the UE checks on the data that is delivered by PDSCH, which is addressed by the PDCCH. If the content of the data includes the unique identifier of its own, the UE terminates the random access procedure determining that a random access procedure has been completed. The UE acquires C-RNTI through the 4 message, and after that, the UE and network are to transmit and receive a UE-specific message by using the C-RNTI.

The following is a description of the way how to resolve a collision in the random access.

The reason why a collision is occurred in performing the random access is that the number of random access preamble is limited basically. That is, it is not available that the eNB assigns a unique random access preamble for the UE to all the UEs, and the UE should randomly select one among the common random access preambles and transmit. According to this, a case is occurred that two or more UEs select the identical random access preamble through the identical radio resource (PRACH resource) and transmit, but the eNB recognizes it as one random access preamble that is transmitted from one UE. Accordingly, the eNB transmits the random access response to the UE and expects that the random access response is supposed to be received by one UE. However, as described above, as there is a possibility that a collision is occurred, two or more UEs are going to receive one random access response, and according to this, each UE performs an operation by the receipt of random access response. That is, there is a problem that two or more UEs transmit different data to the same radio resource by using one UL grant included in the random access response. According to this, the data transmission might be all failed, and depending on the location of UEs or transmission power, the data of a specific UE only may be received by the eNB. In the latter case, as all of the two or more UEs assume that the data transmission of its own are succeeded, the eNB should inform the fact to the relevant UEs that they are failed in contention. That is, what to inform the fact of the failure or success in contention is referred to as contention resolution.

There are two ways of contention resolution. The one is to use the contention resolution timer, and the other is to transmit the identifier of successful UE to UEs. The former is applied to the case that the UE already has a unique C-RNTI before the random access procedure. That is, the UE that already has the C-RNTI transmits the data including the C-RNTI of itself according to the random access response and operates the contention resolution timer. And if the PDCCH information that is addressed by the C-RNTI of its own is received before the contention resolution timer is terminated, the UE judges itself to succeed in the contention and normally terminates the random access. In the contrary, if the PDCCH information that is addressed by the C-RNTI of its own is not received before the contention resolution timer is terminated, the UE judges itself to fail in the contention and renews the random access procedure, or informs the fact of failure to the higher layer. In the latter case of the ways of contention resolution, that is, the case that is to transmit the identifier of successful UE, is used for what the UE does not have a unique C-RNTI before the random access procedure. That is, in case that the UE itself does not have C-RNTI, the UE transmits including a higher identifier (S-TMSI or random number) more than the C-RNTI of data according to the UL Grant included in the random access response, and operates the contention resolution timer. In case that the data including the higher identifier of its own is transmitted to DL-SCH before the contention resolution timer is terminated, the UE judges that the random access procedure is successful. On the other hand, in case that the data including the higher identifier of its own is not transmitted to DL-SCH before the contention resolution timer is terminated, the UE judges that the random access procedure is failed.

Meanwhile, the operation of the non-contention-based random access procedure, unlike the contention-based random access procedure illustrated in FIG. 9, is terminated with the transmission of message 1 and message 2 only. However, the UE is going to be allocated a random access preamble from the eNB before transmitting the random access preamble to the eNB as the message 1. And the UE transmits the allocated random access preamble to the eNB as the message 1, and terminates the random access procedure by receiving the random access response from the eNB.

FIG. 10 is a diagram for describing the non-contention-based random access procedure in the wireless communication system to which the present invention can be applied.

(1) The allocation of the random access preamble

As described above, the non-contention-based random access procedure may be performed in order for (1) the case of handover procedure, (2) the case of being requested by the eNB command, or (3) the UE positioning and/or the timing advance alignment for sTAG. Of course, the contention-based random access procedure may be performed for the cases mentioned above.

First, it is important to receive the random access preamble that is designated and has not possibility of collision for the non-contention-based random access procedure. In case that the eNB allocates a specific random access preamble to a specific UE, the random access preamble used the relevant specific UE only and the other UEs don't use the random access preamble, and so there is not occurred a collision with other UEs. The way how to take instruction of the random access preamble is to use the handover command and PDCCH command. The UE is allocated with the random access preamble through this.

(2) Message 1 (Msg 1)

The UE, as described above, is allocated the random access preamble designated to itself and transmits the allocated preamble to the eNB.

(3) Message 2 (Msg 2)

The way how to receive the random access response information is similar to the contention-based random access procedure described above. That is, the UE transmits the random access preamble and then, attempts to receive the random access response of its own within the random access response window instructed by through system information or handover command by the eNB. Through this, it is available to receive UL grant, temporary C-RNTI and TAC and so on.

In the non-contention-based random access procedure, the random access procedure may be terminated judging that the random access procedure is normally completed by receiving the random access response information.

FIG. 11 is a diagram for describing a latency taken for each contention-based random access procedure required in 3GPP LTE-A system to which the present application can be applied.

In FIG. 11, the random access procedure of 4 steps (contention-based random access) described is exemplified. In LTE-A system, based on the random access procedure of 4 steps for an initial network access, the latency represented in Table 3 below is required.

Table 3 represents the latency in contention-based random access which is required in LTE-A system.

TABLE 3

| Procedure | Description | Time (ms) |
|---|---|---|
| 1 | Average delay due to RACH scheduling period (1 ms RACH cycle) | 0.5 |
| 2 | RACH Preamble | 1 |
| 3-4 | Preamble detection and transmission of RA response (Time between the end RACH transmission and UE s reception of scheduling grant and timing adjustment) | 3 |
| 5 | UE Processing Delay (decoding of scheduling grant, timing alignment and C-RNTI assignment + L1 encoding of RRC Connection Request) | 5 |
| 6 | Transmission of RRC and NAS Request | 1 |
| 7 | Processing delay in eNB (L2 and RRC) | 4 |
| 8 | Transmission of RRC Connection Set-up (and UL grant) | 1 |
| | Total delay | 15.5 |

Referring to FIG. 11 and Table 3, as an average delay due to a RACH scheduling duration that has a RACH cycle of 1 ms, 0.5 ms is required, and 1 ms is required to transmit a random access preamble (RACH preamble) and to be arrived at an eNB. As a time required for detecting the preamble in the eNB and transmitting the random access response, that is, from an end time of a RACH transmission and until receiving a scheduling grant and a timing adjustment, 3 ms is required. 5 ms is required for L1 layer encoding of the scheduling grant, the timing adjustment and the RRC connection request by a UE and a processing delay in a UE such as a C-RNTI assignment. And 1 ms is required for transmitting the RRC and NAS request, and 4 ms is required for a processing delay in L2 and the RRC layer of an eNB. And 1 ms is required for transmitting an RRC connection establishment (and UL grant) by an eNB. As such, total 15.5 ms is required for completing contention-based random access procedure.

As described above, the UE in a state before being connected with network should perform 4 steps of the random access procedure in order to be allocated with UL resources required to transmit the RRC/NAS request message for transmitting its information, and this causes to increase the latency in the procedure.

Meanwhile, in 3GPP LTE/LTE-A system, in order to maximize resource utilization, the data transmission and reception method based on scheduling of an eNB is used. This signifies that if there are data to transmit by a UE, the UL resource allocation is preferentially requested to the eNB, and the data may be transmitted using only UL resources allocated by the eNB.

FIG. 12 illustrates a UL resource allocation procedure of a UE in the wireless communication system to which the present application can be applied.

For effective utilization of the UL radio resources, an eNB should know which sorts and what amount of data to be transmitted to the UL for each UE. Accordingly, the UE itself may forward the information of UL data to transmit, and the eNB may allocate the UL resources to the corresponding UE based on this. In this case, the information of the UL data that the UE forwards to the eNB is the quality of UL data stored in its buffer, and this is referred to as a buffer status report (BSR). The BSR is transmitted using a MAC control element in case that the resources on the PUSCH in current TTI are allocated to the UE and the reporting event is triggered.

FIG. 12(a) exemplifies a UL resource allocation procedure for actual data in case that the UL radio resources for the buffer status reporting (BSR) are not allocated to a UE. That is, for a UE that transits a state of active mode in the DRX mode, since there is no data resource allocated beforehand, the resource for UL data should be requested starting from the SR transmission through the PUCCH, in this case, the UL resource allocation procedure of 5 steps is used.

Referring to FIG. 12(a), the case that the PUSCH resource for transmitting the BSR is not allocated to a UE is illustrated. The UE transmits the scheduling request (SR) to an eNB first in order to be allocated with the PUSCH resources (S1201).

The scheduling request (SR) is used to request in order for the UE to be allocated with the PUSCH resource for UL transmission in case that the reporting event is occurred but the radio resource is not scheduled on the PUSCH in current TTI. That is, the UE transmits the SR on the PUCCH when the regular BSR is triggered but does not have the UL radio resource for transmitting the BSR to the eNB. The UE transmits the SR through the PUCCH or starts the random access procedure according to whether the PUCCH resources for the SR are configured. In particular, the PUCCH resources in which the SR can be transmitted may be determined as a combination of the PRB through which the SR is transmitted, the cyclic shift (CS) applied to a basic sequence (e.g., ZC sequence) for spread in frequency domain of the SR and an orthogonal code (OC) for spread in time domain of the SR. Additionally, the SR periodicity and the SR subframe offset information may be included. The PUCCH resources through which the SR can be transmitted may be configured by a higher layer (e.g., the RRC layer) in UE-specific manner.

When a UE receives the UL grant for the PUSCH resources for BSR transmission from an eNB (S1203), the UE transmits the BSR triggered through the PUSCH resources which are allocated by the UL grant (S1205).

The eNB verifies the quality of data that the UE actually transmit to the UL through the BSR, and transmits the UL grant for the PUSCH resources for actual data transmission to the UE (S1207). The UE that receives the UL grant for actual data transmission transmits the actual UL data to the eNB through the PUSCH resources (S1209).

FIG. 12(b) exemplifies the UL resource allocation procedure for actual data in case that the UL radio resources for the BSR are allocated to a UE.

Referring to FIG. 12(b), the case that the PUSCH resources for BSR transmission are already allocated to a UE is illustrated. In the case, the UE transmits the BSR through the allocated PUSCH resources, and transmits a scheduling request to an eNB (S1211). Then, the eNB verifies the quality of data to be transmitted to the UL by the UE through the BSR, and transmits the UL grant for the PUSCH resources for actual data transmission to the UE (S1213). The UE that receives the UL grant for actual data transmission transmits the actual UL data to the eNB through the allocated PUSCH resources (S1215).

Accordingly, due to system characteristics of transmitting data based on scheduling by an eNB, the problem of increasing the latency even in case of transmitting UL data of a UE.

Contention-Based Radio Resource Configuration

In order to solve the above problem, the present invention proposes to define contention-based PUSCH zone in order to minimize the latency in control plane of a UE such as an SR transmission, a UL grant transmission, and the like and to minimize the latency in an initial access procedure in 5 generation (5G) wideband wireless communication system.

The zone proposed in the present invention may be configured in a cell that serves a specific eNB, and may be used for the UL data that the UE belonged to the corresponding cell. But not limited to this, and also may be limitedly used only for the UL data which is to be transmitted by a specific UE, a specific service or within a specific procedure. For example, this may be limitedly used only for the UL data which are to be transmitted in an M2M UE that should quickly transmit data when generated although the data transmission is not frequently generated or in a UE used for a health care service. In addition, in 3GPP LTE/LTE-A, a UE is classified into a plurality of categories according to a performance of UE such as a maximum peak data rate and a multi-input multi-output (MIMO) transmission capacity, etc (refer to 3GPP TS 36.306), and the contention-based PUSCH zone may be used only for a UE that belongs to a specific category. Additionally, it may also be limitedly used for a service that requires fast data transmission such as an emergency call or a specific service that is required to provide a seamless service. In addition, it may also be limitedly used only UL data transmitted in a specific procedure such as an RRC/NAS request message in a random access procedure or a BSR message in a UL resource allocation procedure.

FIG. 13 illustrates an example of a contention-based radio resource configuration according to an embodiment of the present invention.

In the present invention, contention-based PUSCH zones (hereinafter, referred to as a 'CP zone') (1301, 1303) signify resource regions in which a contention-based UL data transmission allocated within a subframe is available. That is, the zones signify a region in which a UE may transmit UL data competitively without UL resource allocation scheduling of an eNB for the UL data transmission of a UE. The CP zones (1301, 1303) may be setup to a specific resource region on a PUSCH region in which UL data can be transmitted. The CP zones (1301, 1303) may be configured to be comprised of the same pattern within n (n>=1) subframes (or m (m>=1) radio frames). Also, the CP zones (1301, 1303) may be setup only a part of UL subframes considering resource utilization.

Each of the CP zones (1301, 1303) may include N contention-based PUSCH resource blocks (hereinafter, referred to as 'CPRB') (1305) that may occupy one or more UE(s). The CPRB (1305) signifies a UL resource region that a UE may occupy (e.g., use) for a specific procedure within the CP zone. Each of the CPRBs that constructs the CP zone has its own unique index (e.g., CPRB #1, CPRB #2, etc.), and the CPRB indexes may be configured in ascending/descending order in a time domain or may be configured in ascending/descending order in a frequency domain. In addition, the CPRB indexes may be configured by combining ascending/descending order in a time domain and a frequency domain. For example, in the lowest frequency domain of the CP zone, the CPRB indexes are given in ascending order in a time domain, and the CPRB indexes may be given in the next lowest frequency domain in ascending order in a time domain. Such CPRB index information may be transmitted to a UE with being included in a master information block (MIB) or a system information block (SIB). Also, indexes are given by a rule predefined between an eNB and a UE, and the UE may inherently know each CPRB index.

When a UE uses the CPRB, one UE may uses one or more CPRB (1305) according to a quality of UL data that the UE is going to transmit, a procedure performed by the UE to transmit the UL data, a service that the UE to transmit the UL data is using, and the like. Herein, different number of CPRBs may be used for each of UEs. For example, in case that there are N CPRBs that construct the CP zone, one CPRB may be used for each UE such that UE 1 uses CPRB #1, UE 2 uses CPRB #2, and UE 3 uses CPRB #3. Or, one UE may use a plurality of CPRBs such that UE 1 uses CPRB #1, CPRB #2 and CPRB #3, and the number of CPRB used by a UE may be different. Or, different UEs may share and use an identical CPRB (1305) such that both of UE 1 and UE 2 use CPRB #1.

Each UE may use the CPRB competitively, and the CPRB may be allocated to each UE that requests a desired CPRB to an eNB, in case that the CPRB is allocated to each UE by the eNB or the UE receives CPRB related information of the CP zone from the eNB. When allocating CPRB to each of UEs in an eNB, the eNB may map the UE that enters a cell and the CPRB in 1:1 manner, in case of a small cell in which the number of UE (or the number of user) that may be accommodated in a cell. As an example, if the maximum number of UE that can be accommodated in a small cell are N, an eNB (secondary eNB) of the small cell allocates the CP zone for N UEs and does not permit to enter cell for UEs that exceed N. In addition, a macro eNB that includes a coverage of small cell exchanges information with an eNB of the small cell through a backhaul interface, and the macro eNB may also allocate a CPRB which is usable in the small cell to a UE in case that the UE having connection with the macro eNB adds the connection with the eNB of the small cell through a dual connectivity. Herein, the dual connectivity signifies an operation that the UE uses radio resources which are provided by at least two different network points (e.g., a macro eNB and a secondary eNB) which are connected by non-ideal backhaul.

In addition, the CP zones (1301, 1303) may be configured with being distinguished for each procedure, and the CP zones (1301, 1303) for different procedures may be configured in the same or different regions in different regions within a subframe or between subframes. FIG. 13 illustrates that each of the CP zone (UL contention zone) (1301) for RACH and the CP zone (UL contention zone) (1303) for other procedures except the RACH is configured. As such, in case the CP zone is configured with being distinguished by each procedure, a location of the zone, a size of the zone or a shape of the zone, each configured for procedure may be differently configured. The fact that each size of the CP zones (1301, 1303) is differently configured signifies that the number of CPRBs (1305) that configure the CP zone (1301, 1303) is different. FIG. 13 illustrates that the CP zone (1301) for the RACH is configured to two CPRBs (1305) in a time domain and to 3 CPRBs (1305) in a frequency domain, and comprised of total six CPRBs (1305). On the contrary, it is illustrated that the CP zone (1303) for different procedures except the RACH is comprised of one CPRB (1305) within a slot in a time domain, the shape of zone is different from the CP zone (1301) for the RACH.

A contention-based PUSCH group (hereinafter, referred to as 'CP group') (1307) may be comprised of one or more CP zone(s) (1301), and signifies a resource region in which the UEs that occupy the CPRB resources may contend in an arbitrary time, that is, a set of candidate CPRB(s) that an arbitrary UE may occupy. Like the CP zone (1303) for different procedure except the RACH, it is also possible to configure the CP group (1307) using one CP zone (1303). In this case, the CP zone and the CP group have the same region in case of being configured.

In the specification, the concept that embraces of the CP zone, the CPRB and CP group described above will be referred to as a 'contention-based radio resource'.

In case that a UE performs a random access procedure (RACH procedure) using the CP zone, the UE may transmit the RRC message to an eNB together with a RACH preamble sequence or sequentially through the CP zone.

That is, in case of the RACH procedure based on the CP zone according to the present invention, a UE may transmit the RACH preamble message and the RRC message using the same time or a continuous time resource to an eNB, which is different from a general RACH procedure of transmitting the RRC message only in case of receiving a UL grant through a random access response message after transmitting the RACH preamble sequence. Herein, the same time resource signifies a radio resource in the same subframe, and the continuous time resource signifies a radio resource in a subframe next to the subframe in which the RACH preamble is transmitted.

The CP zone defined in the present invention may be configured with an intra-subframe or an inter-subframe scheme in a relation to a PRACH region in which the RACH preamble is transmitted, and two schemes may be coexisted and configured. This will be described in detail with reference to FIG. 14.

FIG. 14 illustrates an example of a contention-based radio resource configuration according to an embodiment of the present invention.

FIG. 14(*a*) illustrates the intra-subframe scheme. In the intra-subframe configuration scheme, the CP zone is divided into a PRACH region and different time resources (time division multiplexing; TDM) or divided into frequency resources (frequency division multiplexing; FDM) within the same subframe.

FIG. 14(*b*) illustrates the inter-subframe scheme. In the inter-subframe configuration scheme, the CP zone is divided by different TTIs and allocated through subframe resources adjacent to the PRACH resource region.

FIG. 14(*c*) illustrates a scheme in which the intra-subframe scheme and the inter-subframe scheme are coexisted. In the coexisted scheme, the CP zone is allocated with being divided into different time resources or different frequency resource to one PRACH region, and allocated with being divided into different TTIs to another PRACH region through an adjacent subframe resource. In addition, in order to maximize the resource utilization in a cell, the PRACH resource region or the CP zone may not be configured in a specific subframe.

The resource region configuration scheme may be determined by various methods according to a cell operating method as well as the schemes of FIG. 14(*a*) to FIG. 14(*c*) described above.

Meanwhile, in FIG. 14, a radio frame of type 1 which is applicable to the FDD in 3GPP LTE/LTE-A standard is assumed and exemplified, but the CP zone, the CPRB and the CP group may be configured in the same manner in a radio subframe of type 2 which is applicable to the TDD.

The CP zone, the CPRB and the CP group described above are predefined in a specific cell, an eNB of the corresponding cell transmits the configuration information for the contention-based radio resource to a UE in order to notify that the contention-based radio resource is configured. Herein, the above specific cell may signify a small cell such as a femto cell, a pico cell and a micro cell or a macro cell.

The configuration information for the contention-based radio resource may include the UL resource information in which the CP zone is configured and the information required to transmit data that may be transmitted through the CPRB configured in the CP zone. In addition, the configuration information for the contention-based radio resource may include the information that represents whether the contention-based radio resource is configured or not, and the information that represents whether the contention-based radio resource or not may be transmitted separately to the UE.

The UL resource information in which the CP zone is configured signifies the information for time/frequency resource domain in which the CP zone is configured. In addition, since the CP zone may be configured only to a part of UL subframe considering the resource utilization, in this case, the information on whether the subframe is configured or not be included.

Also, a value that represents the number (N) of CPRBs constructing one CP zone which is configured and a value that represents the number (M) of CP zones that attempt to occupy resources by an arbitrary UE on a specific timing may be included. Herein, N*M signifies a number of CPRBs that an arbitrary UE may select on a specific timing. For example, in case that one CP zone is comprised of four CPRBs, and one CP group is comprised of two CP zones, a UE has candidate CPRBs as many as N*M=8.

A maximum resource block size per UE, a modulation and coding scheme (MCS) level, an initial transmission power reference, and the like may correspond to the information required to transmit data which may be transmitted through the configured CPRB.

The configuration information of the contention-based radio resource may be transmitted with a broadcasting message, transmitted with a unicast message for a specific UE, or transmitted with a multicast message for one or more UE group(s).

The configuration information of the contention-based radio resource may be transmitted to a UE through a master information block (MIB). The configuration information of the contention-based radio resource may be included in the MIB that transmits information of essential physical layer.

Additionally, the configuration information of the contention-based radio resource may be transmitted to a UE through the existing system information block (SIB)-x. The case of being transmitted through the SIB-x is the case in which the CP zone is configured for an initial network access, and the configuration information of the contention-based radio resource may be transmitted with being included in the SIB-2. For example, in case that the CP zone is configured for the RACH procedure, a UE pre-recognizes that it may access to a cell through the RACH procedure based on the CP zone before the UE accesses the cell, by adding information for the CP zone in the SIB-2.

Also, new SIB-y may be defined as well as the existing SIB-x, and through this, the configuration information of the contention-based radio resource may be transmitted to a UE. That is, in case that the CP zone is configured for the procedure after network access, the configuration information of the contention-based radio resource may be transmitted through the new SIB definition. Herein, an eNB may transmit an indication that notifies the newly defined SIB information to be a cell with being included in the MIB, the SIB-1 or the SIB-2 to a UE.

In addition, the configuration information of the contention-based radio resource may be transmitted to a specific UE using a unicast scheme through a new control message. In case that a UE is connected to a cell, by transmitting the configuration information of the contention-based radio resource only to the UE that is required to use the CP zone through the unicast scheme, the configuration information of the contention-based radio resource may be received by a specific UE. In case that a UE accesses (or enters) to a cell, by transmitting the information that notifies a use of the CP zone to an eNB when accessing cell, the eNB may transmit the configuration information of the contention-based radio resource to the UE through a unicast message.

Hereinafter, a method of using the CP zone in the RACH procedure and the UL resource allocation procedure will be described with reference to FIG. 15 and FIG. 16.

First, a method of using the CP zone in the RACH procedure will be described.

In case of using the CP zone in the RACH procedure, a UE may use the CP zone as a UL resource for transmitting an RRC message and/or a NAS message. That is, in case of the contention-based random access procedure, the CP zone may be used for transmitting a third message (e.g., an RRC connection request message) of FIG. 9. In addition, in case of non-contention-based random access procedure, the CP zone may be used as a UL resource for transmitting an RRC message after completing the RACH procedure of FIG. 10.

The RRC message transmitted through the CP zone may correspond to one of the followings depending on a RACH procedure which is performed.

1. In case of performing the RACH procedure for an initial access, the RRC message transmitted through the CP zone may correspond to an RRC connection request message.

2. In case of performing the RACH procedure for a handover (HO), the RRC message transmitted through the CP zone may correspond to an RRC connection reconfiguration complete message.

3. In case of performing the RACH procedure for an RRC connection re-establishment, the RRC message transmitted through the CP zone may correspond to an RRC connection re-establishment request message.

FIG. 15 illustrates a random access procedure using the contention-based radio resource according to an embodiment of the present invention.

FIG. 15(*a*) illustrates an example of using the contention-based radio resource in the contention-based random access procedure, and FIG. 15(*b*) illustrates an example of using the contention-based radio resource in the non-contention-based random access procedure.

Referring to FIG. 15(*a*), a UE transmits a RACH preamble sequence through the PRACH, and simultaneously or sequentially transmits an RRC message to an eNB through the CP zone (particularly, through the CPRB of the CP zone) (S1501). Herein, the RRC message may correspond to the RRC connection request message or the RRC connection re-establishment request message.

The eNB transmits a contention resolution as an RRC response message to the UE (S1503).

As such, the UE transmits the RRC message from the eNB through the CP zone without separate UL grant, and receives the UL grant from the eNB. Through this, there is an effect to shorten the time for transmitting the RRC message. In other word, the UE performs the contention-based random access procedure through the CP zone, thus, two steps of RACH procedure may be performed by transmitting the message 3 and the RACH preamble sequence simultaneously or sequentially.

Referring to FIG. 15(*b*), after a UE is allocated with the RACH preamble sequence from an eNB (S1505), the UE transmits the allocated RACH preamble sequence and the RRC message simultaneously or sequentially to the eNB (S1507). Herein, the allocated RACH preamble sequence is transmitted through the PRACH, and the RRC message is transmitted to the eNB through the CPRB of the CP zone. Herein, the RRC message may correspond to an RRC connection re-configuration completion message.

The eNB transmits a random access response message to the UE in response to the random access (S1509).

As such, in case of transmitting the RRC message through the CP zone, by transmitting the RRC message, which could be transmitted after the RACH procedure, while performing the RACH procedure simultaneously, the overall RRC procedure (e.g., performing handover) can be more quickly performed.

Meanwhile, in FIG. 15(a) and FIG. 15(b) above, the UE may omit to transmit the RACH preamble to the eNB. That is, the UE may omit to transmit the RACH preamble if the UE acquires the timing alignment (TA) value for the UL synchronization from the eNB through the DL data reception in advance in the RACH procedure. For example, the UE may acquire the TA value in advance by using a global positioning system (GPS) or acquiring a time difference value from the eNB in advance.

As such, in case that the RACH preamble transmission of the UE is omitted, the UE performs the RACH procedure by transmitting only the RRC message to the eNB through the CPRB in step S1501 of FIG. 15(a) and step S1507 of FIG. 15(b). As a result, in case of using the CP zone for the RACH procedure, the RACH procedure is different from a general RACH procedure that does not use the CP zone as follows.

The contention-based random access procedure: RACH procedure of 4 steps? RACH procedure of 2 steps The non-contention-based random access procedure: RACH procedure of 3 steps+RRC message transmission->RACH procedure of 3 steps including the RRC message transmission.

As described above, when performing the RACH procedure of 2 steps, the existing random access procedure of 4 steps may be decreased to 2 steps, thereby minimizing overall latency in an initial access procedure.

This has an effect of decreasing a delay of the initial random access procedure to minimum 6.5 ms, which was 15.5 ms (refer to FIG. 11 above) conventionally, in case that the preamble and the CP zone coexist within the same TTI.

Next, a method of utilizing the CP zone in a UL resource allocation procedure will be described.

As described in FIG. 12, as a UL resource allocation method based on general eNB scheduling which is not utilizing the CP zone, there are UL resource allocation procedure of 5 steps and UL resource allocation procedure of 3 steps.

The UL resource allocation procedure of 5 steps is made up of 5 steps of procedure: a UE request a UL scheduling to an eNB, and the eNB transmits a UL grant for the BSR, and through this, the UE transmit the BSR to the eNB. Later, the eNB transmits the UL grant for actual data transmission of the UE, and the UE transmits the actual data to the eNB through the UL grant.

Also, the UL resource allocation procedure of 3 steps is made up of 3 steps of procedure: a UE transmits a UL scheduling request and the BSR simultaneously to an eNB, and the eNB transmits a UL grant for actual data transmission of the UE to the UE. Later, the UE transmits the actual data to the eNB through the UL grant.

In the UL resource allocation procedure based on an eNB scheduling using the CP zone, the UL resource allocation procedure of 5 steps is changed to 3 steps, and the 3 steps is changed to 1 step, as shown in FIG. 16.

FIG. 16 illustrates a UL resource allocation procedure using a contention-based radio resource according to an embodiment of the present invention.

FIG. 16(a) illustrates an example of UL resource allocation procedure using a contention-based radio resource (3 steps), and FIG. 16(b) illustrates an example of UL resource allocation procedure using a contention-based radio resource (1 step).

Referring to FIG. 16(a), in the UL resource allocation procedure of 3 steps based on an eNB scheduling using the CP zone, a UE does not receive a UL grant for the BSR from an eNB, but the UE transmits the BSR through the CP zone (S1603).

Later, the UE receives the UL grant for actual data transmission from the eNB (S1605) and the UE transmits the actual data to the eNB using the received UL grant (S1607).

Referring to FIG. 16(b), a UE may transmit the BSR together with actual data to an eNB using the CP zone (S1611).

Accordingly, in case of performing the UL resource allocation procedure using the CP zone, the general UL resource allocation procedure of 5 steps changed to the UL resource allocation procedure of 3 steps, and the general UL resource allocation procedure of 3 steps changed to the UL resource allocation procedure of 1 step.

Herein, in order to perform the UL resource allocation procedure (3 steps and 1 step) using the CP zone, first, an eNB may transmit the configuration information for the contention-based radio resource described above (S1601 and S1609). It may be preferable that the configuration information for the contention-based radio resource is transmitted through the SIB since the configuration information for the contention-based radio resource is system related information, but not limited thereto, and may be transmitted in various methods.

As described above, in case of performing the UL resource allocation procedure using the CP zone, the time for a UE to request the UL resources to an eNB and for being allocated with the UL resources from the eNB can be decreased. Accordingly, there is an effect of decreasing overall procedure latency in comparison with a general UL resource allocation procedure based on eNB scheduling.

Hereinafter, a method for solving collision that may occur when UL data is transmitted by two or more terminals through a CP zone will be described by using a case of performing a RACH procedure as an example.

First, in the CP zone, since UEs that want to perform a RACH procedure occupy resources, i.e., CPRB, through contention, collision may occur in the process of occupying the CPRB. In this case, even though two or more UEs select different RACH preamble sequences, failure of the RACH procedure may occur due to collision through simultaneous occupancy of a PUSCH resource.

FIG. 17 is a view illustrating an example in which collision occurs while a RACH procedure is being performed using contention-based radio resource according to an embodiment of the present invention.

FIG. 17 shows cases in which collision occurs and does not occur when two UEs simultaneously perform RACH procedure through a CP zone having two CPRBs, for example.

First, the left side of FIG. 17 shows a case in which collision occurs in RRC message transmission.

The UE 1 and UE 2 transmit different RACH preamble sequences in a PRACH region of a first subframe to a BS. Thereafter, the UE 1 and UE 2 transmit an RRC message through CPRB #2 of a CP zone set in a next subframe (e.g., second subframe). In this case, due to the CRPB (e.g., CPRB #2) occupation of the UE 1 and UE 2, collision occurs, and as a result, RRC message transmission of the UE 1 and UE 2 fail.

The right side of FIG. 17 shows a case in which collision does not occur in the RRC message transmission.

The UE 1 and UE 2 transmit different RACH preamble sequences in the PRACH region of a seventh subframe. Thereafter, the UE 1 transmits an RRC message through CRPB #2 of the CP zone allocated to a next subframe (e.g., eighth subframe) to the BS, and the UE 2 transmits an RRC message through the CPRB #1 of the CP zone allocated to the next subframe (e.g., eighth subframe) to the BS. In this case, the UE 1 and UE 2 do not occupy the same CPRB, CPRB collision does not occur and RRC messages of each UE are successfully transmitted.

FIG. 18 is a view illustrating a method for preventing CPRB collision according to an embodiment of the present invention.

In FIG. 18, a method for minimizing failure of an RRC message transmission through CPRB by randomly selecting a CPRB when a RACH procedure is performed using a CP zone is illustrated.

Each UE randomly selects a CPRB in the CP zone at a point in time at which a PRACH is transmitted, and transmits an RRC message through the CPRB randomly selected by each UE. Here, in a case in which transmission of the RRC message fails because the CPRB randomly selected by each UE is simultaneously occupied by the UEs, each UE performs again the RACH procedure by using a back-off time (i.e., RACH preamble and RRC message retransmission)

Namely, in a case in which each UE re-performs the RACH procedure, the back-off time for performing the RACH procedure again is differently set for each UE in order to prevent occurrence of collision due to simultaneous occupation of the CPRB again. Here, the back-off time may be set by the BS or according to a UE request. For example, the back-off time may be set such that a preamble and an RRC message of UE 2 are transmitted in a next period after transmission of RACH preamble and RRC message of UE 1 is finished.

Here, even in a case in which the RACH procedure is designed not to transmit the PRACH, the method of randomly selecting a CPRB as described above may be applied in the same manner.

In detail, referring to FIG. 18, the UE 1 and the UE 2 transmit different RACH preamble sequences to the BS through the PRACH region allocated to the first subframe. Thereafter, the UE 1 and the UE 2 randomly select a CPRB to use the CP zone, and here, as illustrated in FIG. 18, CPRB #2 is selected. Here, a point in time at which each UE randomly selects the CPRB may be a point in time at which contention-based radio resource configuration information is received from the BS, a point in time at which each UE transmits an RACH preamble, or a point in time at which each UE transmits an RRC message through the CPRB of the CP zone.

When the UE 1 and the UE 2 transmit the RRC messages through the CPRB #2, the RRC message transmission of each UE fails. Thereafter, when an RRC message timer expires and after the lapse of the back-off time applied to each UE to re-perform the RACH procedure, the UE 1 and the UE 2 re-transmit a preamble through the PRACH and transmit an RRC message through the CRPB #2 randomly selected by the UE 1 and the UE 2.

Namely, the UE 1 and the UE 2 transmits the RRC messages to the BS by using the CPRB as is randomly selected previously by using the back-off time differently applied thereto. Here, UE 1 and the UE 2 may randomly select the CPRB again after the lapse of the back-off time. However, in order to minimize collision due to simultaneous occupation of the CRPB, preferably, the UE 1 and the UE 2 may transmit the RRC message through the already selected CPRB.

When RRC message collision occurs, the BS may transmit the information regarding the back-off time applied to each UE. In this case, the BS may set different back-off time in each UE in consideration of UL data having high priority, and the like, among the UEs. In the case of FIG. 18, the UE 2 having a shorter back-off time first transmits the RRC message to the BS through the CPRB #2, and the UE 1 transmits the RRC message to the BS through the CPRB #2 at a next period in which the CP zone is allocated.

FIG. 19 is a view illustrating a method for preventing CPRB collision according to an embodiment of the present invention.

In FIG. 19, a method for minimizing failure of RRC message transmission through a CPRB by implicitly selecting a CPRB on the basis of a randomly selected preamble when a RACH procedure is performed using a CP zone is illustrated.

In this method, a UE randomly selects an RACH preamble sequence (in case of contention-based RACH procedure) or selects a CPRB to be used on the basis of an RACH preamble sequence (in case of a non-contention-based RACH procedure) allocated from the BS.

The method of implicitly selecting a CPRB according to FIG. 19 is performed through a modulo calculation of Equation 2 below.

MathFigure 2

$$\text{CPRB(\#)selectedbyUE}=\text{modulo}(\text{SelectedRACHpreamblesequence \% N})  \quad [\text{Math.2}]$$

Here, N denotes a total number of CPRBs that may be occupied by a UE which transmits an RACH preamble. Also, the N value is a value received from the BS through system information, or the like.

In case of a non-contention-based RACH procedure, the UE occupies a CPRB on the basis of an RACH preamble sequence already allocated from the BS, the BS may allocate an RACH preamble sequence to each UE in advance such that collision may not occur when the UEs to perform the non-contention-based RACH procedure occupies the CPRB.

FIG. 19(*a*) illustrates an example in which a CPRB is allocated in a TDM manner, and FIG. 19(*b*) illustrates an example in which a CPRB is allocated in an FDM manner.

As illustrated in FIG. 19(*a*) and FIG. 19(*b*), the UE 1 selects an RACH preamble sequence #2 and the UE 2 selects an RACH preamble sequence #4, and a total number of CPRBs of the CP zone is 4. Here, when the CPRBs selected by the UE 1 and the UE 2 are calculated by Equation 2, the CPRB selected by the UE 1 is CPRB #2 (modulo(2/4)), and the CRPB selected by the UE 2 is CPRB #= CPRB #0 (modulo(4/4)). Thus, the UE 1 transmits an RRC message to the BS through the CPRB #2 and the UE 2 transmits an RRC message to the BS through the CPRB #0.

Similarly to the foregoing method, each UE may select a CPRB according to Equation 3 on the basis of a UE ID. Namely, UE ID-based CPRB selection is performed using Equation 3 below.

MathFigure 3

$$\text{CPRB(\#)selectedbyUE}=\text{modulo}(\text{UEID \% N})  \quad [\text{Math.3}]$$

Here, N is a total number of CPRBs that may be occupied by UEs performing the RACH procedure, and the N value may be transmitted to each UE through system information (SIB) as system related information. The UE ID may be a UE-specific identifier (e.g., IMSI, GUTI, S-TMSI, or IP address (PDN address)), or may be an identifier such as C-RNTI used to identify UEs in a cell. Namely, the UE ID may be UE IDs variously used in a cellular network.

Hereinafter, a method for solving collision when CPRB collision occurs by the method of FIG. 19 will be described.

FIG. 20 is a view illustrating a method for solving the collision according to the method of FIG. 19 according to an embodiment of the present invention.

In FIG. 20, (a) illustrates a contention-based RACH procedure, and (b) illustrates a non-contention-based RACH procedure.

First, in the case of the contention-based RACH procedure, when the same CPRB is selected as two or more UEs select the same RACH preamble at the same time or select the same RACH preamble of N multiple, CPRB collision may occur.

In this case, the BS transmits information instructing each UE to perform a general 4-step RACH procedure without using the CP zone, to each UE.

In detail, referring to FIG. 20(*a*), the UE 1 and the UE 2 transmit randomly selected RACH preamble to the eNB (S2001).

Thereafter, the UE 1 and the UE 2 select a CPRB (according to Equation 2 or 3), but since they select the same CPRB, RRC message transmission by the UE 1 and the UE 2 fails (S2003).

Thereafter, when the eNB recognizes the failure of the RRC message transmission due to the CPRB collision, the eNB transmits instructing each UE to perform a general 4-step RACH procedure without using a CP zone, as a preamble response to each UE by using each RA-RNTI determined by RACH preamble reception from each UE, to each UE (S2005). It can be seen that an RA-RNTI transmitted by the eNB to the UE 1 is y and an RA-RNTI transmitted to the UE 2 is x.

Thereafter, the UE 1 and the UE 2 transmit an RRC connection request message to the eNB (S2007), and the eNB transmits an RRC connection setup message to the UE 1 and the UE 2 (S2009).

Referring to FIG. 20(*b*), in case of non-contention-based RACH procedure, since the eNB allocates an RACH preamble sequence to a UE, the eNB allocates an RACH preamble such that a CPRB collision does not occur among UEs selecting the CPRB through an RACH preamble sequence (S2011). In case of FIG. 20, the eNB allocates a preamble x to the UE 1 and a preamble y to the UE 2 such that CPRB (selected by Equation 2 or 3) does not collide.

Thereafter, the UE 1 and the UE 2 transmit RRC request messages to the eNB through a CPRB selected by each UE together with the allocated RACH preamble sequence or continuously to the eNB (S2013, S2015). That is, when the RACH preamble is received from the eNB, each UE transmits an RRC request message to the eNB through a modular (mod) calculation using the preamble sequence number and N (the total number of CPRBs of the CP zone).

Thereafter, the eNB transmits a preamble response message or an RRC response message to the UE 1 and the UE 2 (S2017).

Here, steps S2001, S2003, and S2011 to S2017 are performed in the same TTI.

FIG. 21 is a view illustrating a method for preventing CPRB collision according to an embodiment of the present invention.

In FIG. 21, a method for preventing CPRB collision by a full duplex relay (FDR) UEs by using the method of FIG. 19 is illustrated. Hereinafter, it is assumed in FIG. 21 that UEs are UEs that may perform FDR. Here, the FDR UE refers to a UE that may receive an RACH preamble of a neighbor UE which simultaneously transmits the RACH preamble when the FDR UE transmits its RACH preamble sequence.

The FDR UE may obtain all of RACH preamble sequence information selected by neighbor UEs. Thus, in order to solve CPRB collision, when CPRBs are selected by each UE according to descending order or ascending order of the transmitted RACH preamble sequence number. For example, CPRBs are sequentially allocated in order of preamble sequences, but since a UE which selects a preamble sequence having a smaller value may always have priority, a method of selecting CPRBs combined in various orders may be applied.

Referring to FIG. 21(*a*) and FIG. 21(*b*), it can be seen that the UE 1 selects preamble sequence #2 and the UE 2 selects preamble sequence #4, and UE 3 selects preamble sequence #8. Each UE may know which preamble sequences other UEs have selected.

Since the preamble sequences are determined in order of the UE 1, the UE 2, and the UE 3, namely, in descending order, CPRBs allocated to each UE are also allocated in descending order. Here, since two CPRBs are available, CPRBs are allocated to only to two UEs.

That is, CPRB #0 corresponding to a lower number is allocated to the UE 1, and CPRB #1 is then allocated to the UE 2. In case of UE 3, since there is no available CPRB, a CPRB is not allocated thereto.

Thus, the UE 1 and the UE 2 transmit the RRC message to the eNB through CPRB #0 and CPRB #1 respectively, and the UE 3 abandons RRC message transmission to the eNB at the corresponding point in time (subframe) and, after the back-off time, the UE 3 transmits the RRC message to the eNB by using an available CPRB.

Here, after the back-off time, CPRB #0 may be allocated to the UE 3 in descending order in the same manner as that of the scheme of CPRB allocation to the UE 1 and the UE 2. However, in a case in which other UEs use CPRBs at the point in time when the UE 3 wants to use a CPRB, the UE 3 may be allocated a CPRB in consideration of descending order of the preamble sequence numbers in relation with other UEs.

Also, when a UE performs the RACH procedure using the CP zone, the UE may implicitly selects a CPRB on the basis of a UE ID, thus minimizing failure of RRC message transmission through the CPRB.

Meanwhile, in case of using a contention-based PUSCH zone (CP zone) according to an embodiment of the present invention described above, as the number of UEs performing the RACH procedure increases, collision of PUSCH resources may occur among the UEs in the process of occupying a PCRB. Thus, in order to allow only a designated particular UE to use the CP zone, a UE-specific CP zone may be set or in order to allow a UE to use the CP zone only in a designated specific service, a service-specific CP zone may be set. When the UE-specific zone or the service-specific CP zone is used, the number of UEs that want to occupy UL resource through the CP zone within a cell may be limitedly designated. Thus, the CP zone may be used only for a latency-sensitive UE/service requiring low latency and the conventional UL resource allocation-based procedure may be performed on a latency-tolerant UE/service, whereby resource efficiency of the overall cell can be appropriately maintained and procedure latency can be reduced.

Method for Allocating UE ID in 2-Step Random Access Procedure

According to an embodiment of the present invention, as described above with reference to FIG. 15, the contention-based random access procedure is performed in two steps. In the first step, among the 2-step random access procedure, an RRC message (e.g., an RRC connection request message, an RRC connection reconfiguration complete message, or an RRC connection reestablishment request message) is transmitted to a BS together with an RACH preamble (namely, the same subframe) or continuously (namely, other subframe) through the CP zone. In second step, an RRC message is transmitted by the BS to the UE in response thereto. This will be described in detail with reference to FIG. 22 hereinafter.

FIG. 22 is a view illustrating a 2-step random access procedure according to an embodiment of the present invention.

Referring to FIG. 22, in the first step, a UE transmits an RRC request message/NAS request message to an eNB by using a contention-based PUSCH resource (i.e., CPRB) at the same time when a preamble is transmitted (namely, the same subframe), immediately after the preamble is transmitted (e.g., next subframe), or without transmitting a preamble (S2201). In FIG. 22, a case in which a PRACH region 2207 in which a preamble is transmitted and a CP group 2209 are set in the same subframe is illustrated. In this case the UE transmits an RRC request message/NAS request message through a selected CPRB at the same time when a preamble is transmitted.

Here, the UE may select a CPRB used for transmission of the RRC request message/NAS request message on the basis of a UE ID or the selected preamble, or randomly. In FIG. 22, a case in which the RRC request message/NAS request message is transmitted by selecting a CPRB #1 2205 is illustrated.

As described above, in the random access procedure illustrated in an embodiment of the present invention, when the UE obtains a timing alignment (TA) value for uplink synchronization is obtained through DL data reception in advance, preamble transmission may be omitted. However, for the purposes of description, it is assumed that the UE transmits a preamble.

In the 2-step RACH procedure proposed in the present disclosure, a CPRB may be used as UL resource for transmitting the RRC request message (or RRC+NAS request message) as described above. Namely, it means that, in the case of the 4-step random access procedure (namely, contention-based random access procedure), a CPRB may be used as UL resource for transmission of a third message (Msg3), and in the case of the 3-step random access procedure (namely, non-contention-based random access procedure), a CPRB may be used as UL resource for transmission of an RRC message after the random access procedure.

In the second step, the eNB transmits an RRC connection setup message to the UE in response to the RRC request (S2203). The UE attempts to receive a random access response within a random access response window. In LTE/LTE-A, the random access response window is defined as having a length of "ra-ResponseWindowSize" (in the drawing, window size SF), starting from a subframe after three frames from a final subframe in which a preamble or an RRC/NAS request is transmitted. Namely, the UE monitors to receive a random access response during a random access window secured after three subframes from the subframe in which transmission of the preamble or the RRC/NAS request was terminated.

In this manner, in the case of the contention-based random access procedure, since the conventional third message (Msg3) is transmitted simultaneously together with the preamble, the 2-step procedure may be performed. Also, in the case of the non-contention-based random access procedure, since the RRC message, which is transmitted after the random access procedure, is transmitted simultaneously when the random access procedure is performed, the overall RRC procedure (e.g., handover) can be more rapidly performed.

However, in the conventional 4-step RACH procedure (i.e., random access procedure), a RA-RNTI between the UE and the eNB is calculated by using the preamble transmitted from the UE, and the UE determines whether a message is a preamble response (i.e., random access response) with respect to the preamble which was transmitted by the UE itself. Namely, the UE checks its preamble response message through the RA-RNTI and a preamble index.

When one or more UEs which have transmitted preambles through the same PRACH in the same subframe select different preamble indices, the eNB should transmit preamble responses including the different preamble indices by the number corresponding to the preamble indices received by using the same RA-RNTI. Only when a UE receives a preamble response message including the preamble index which was transmitted by the UE itself, the UE can obtain UL grant for the third message Msg3 through the corresponding message. Namely, in this case, collision between UL data does not occur (collision resolution).

Meanwhile, in a case in which when one or more UEs which have transmitted preambles through the same PRACH select the same preamble index, the eNB transmits a preamble response including the same preamble index once. Namely, two UEs receive the same UL grant and collision occurs between UL data.

Thereafter, the UE transmits an RRC connection request message through the UL grant information transmitted to the UE itself, and receives an RRC connection setup message through a TC-RNTI allocated together with the UL grant (in a case in which the UE has not been allocated a C-RNTI). As the UE checks its UE ID included in the RRC connection setup message, contention resolution is completed.

However, in the case of the 2-step RACH procedure according to the present disclosure, the RRC/NAS request message is transmitted in the first step, and the response message with respect to the RRC/NAS request message is immediately received in the second step. Namely, the UE performing the 2-step RACH procedure should be able to receive an RRC connection setup message transmitted thereto. However, in the related art, a UE uses the RA-RNTI therefor without being allocated a C-RNTI (e.g., in case of an initial access procedure of the UE), and since the RA-RNTI defined in the related art assigns the same value to all the UEs using the same PRACH, the RA-RNTI cannot be used as an identifier for contention resolution. Thus, in the present exemplary embodiment, a method for setting a temporary RNTI or a C-RNTI for completing contention resolution between the eNB and the UE in the second step of the 2-step RACH procedure needs to be defined. In the present disclosure, for the purposes of description, the temporary-RNTI and the C-RNTI will be referred to as "temporary-RNTI (T-RNTI)".

The present disclosure proposes a method for setting a T-RNTI or a C-RNTI for properly transmitting and receiving an RRC connection setup message to be transmitted to a UE in the second step when the UE performs the 2-step RACH procedure. However, as described above, in a case in which the C-RNTI has already been allocated to the UE, the RRC connection setup message may be received through the C-RNTI already allocated to the UE, so, hereinafter, it is assumed that the UE has not been allocated the C-RNTI.

FIG. 23 is a view illustrating a 2-step RACH procedure using a T-RNTI according to an embodiment of the present invention.

Referring to FIG. 23, the UE transmits a preamble to the eNB through a PRACH and transmits an RRC/NAS request message simultaneously (namely, in the same subframe) or continuously (next subframe) to the eNB (S2301). Here, the RRC/NAS request message is transmitted through a UE ID (e.g., international mobile subscriber identity (IMSI), globally unique temporary identifier (GUTI), S-TMSI, etc.) or a preamble-based selected CPRB or a randomly selected CPRB in a contention-based PUSCH group (namely, a CP group) for the RACH procedure. In FIG. 23, an example in which the UE transmits the RRC/NAS request message through a selected CPRB #1 2305 together with preamble transmission (namely, in the same subframe with the preamble transmission) is illustrated.

The UE may obtain a set of available random access preambles and information regarding radio resource used for transmission of the random access preambles from system information. Also, the UE may randomly select a preamble from the set of the random access preambles, select a PRACH resource from the radio resource used for transmission of the random access preambles, and transmit the preamble to the eNB through the selected PRACH resource.

The eNB transmits the RRC connection setup message identified by the T-RNTI allocated on the basis of the CPRB in which the RRC/NAS request message has been transmitted, to the UE (S2303). That is, the eNB allocates a T-RNTI to the UE and transmits an RRC connection setup message to the corresponding UE through a PDSCH indicated by a PDCCH identified by the T-RNTI (namely, masked with T-RNTI) allocated to the UE. Here, the RRC connection setup message may include a UE ID (e.g., the C-RNTI) and a timing alignment (TA).

After transmitting the RRC/NAS request message, the UE monitors to receive a RRC connection setup message with the allocated T-RNTI during a random access response window. Namely, the UE attempts to detect a PDCCH masked with the T-RNTI, and receives the RRC connection setup message transmitted in the PDSCH indicated through the information of the detected PDCCH. Here, the UE monitors to receive the RRC connection setup message during a random access response window from X+1 (ms) to X+((ra_ResponseWindowSize, i.e., X+ra_win_size)(ms) after the transmission of the RRC connection request message. Here, X+1 refers to the shortest period of time during which a response with respect to the RRC request message transmitted by the UE can be received without an error. For example, the X value may have a value equal to or smaller than 3 (e.g., 1, 2, or 3) for low latency.

Namely, the UE monitors to receive the RRC connection setup message during a subframe corresponding to ra_ResponseWindowSize after the X number of subframes from a subframe in which transmission of the RRC connection request message was completed. Thus, when the same T-RNTI is allocated to different UEs during X+ra_ResponseWindowSize from X+1 (ms)(namely, X+ra_win_size (ms)) after transmission of the RRC connection request message, collision may occur between the UEs allocated with the same T-RNTI. Thus, the same T-RNTI should not be allocated during the corresponding interval. The ra_ResponseWindowSize may be transmitted from the eNB through an MIB or an SIB, and may be determined as a value between 2 to 10.

Method 1) Explicit Signaling: T-RNTI and CPRB Mapping in One-to-one Manner

In the 2-step RACH procedure according to an embodiment of the present invention, a T-RNTI may be set by mapping a contention-based PUSCH resource block and a T-RNTI in a one-to-one manner. This will be described in detail with reference to FIG. 24.

FIG. 24 is a view illustrating a method of allocation a T-RNTI in the 2-step RACH procedure according to an embodiment of the present invention.

In FIG. 24, it is assumed that a random access response window (ra_ResponseWindowSize) is 6, two CP groups exist within ra_ResponseWindowSize, six CPRBs exist in each CP group, totaling twelve CPRBs present within the random access window.

In a case in which n number of contention-based PUSCH resource blocks (CPRBs) are present in a contention-based PUSCH group, the same T-RNTI should not be allocated within the interval (i.e., X+ra_ResponseWindowSize) in which the UE waits to receive the RRC connection response message after transmission of the RRC connection request message as described above. Thus, T-RNTIs corresponding to the number of CPRBs that may be included within ra_ResponseWindowSize should be allocated in advance. Namely, the T-RNTIs have unique values within ra_ResponseWindowSize, and CPRBs have unique index values within the CP group. When the eNB transmits contention-based PUSCH information with respect to a cell, the eNB transmits T-RNTI information regarding each CPRB together. Mapping information regarding the T-RNTIs and the CPRBs (T-RNTI mapping for RACH) may be transmitted in an MIB or SIB, and preferably, transmitted in an SIB2 in which RACH information is transmitted.

As in the example of FIG. 24, when 12 CPRBs exist within the random access response window, 12 different T-RNTIs are allocated to the CPRBs, respectively. In this manner, the information regarding different T-RNTIs respectively corresponding to CPRBs may be included in the MIB or SIB (SIB2 in the case of FIG. 24) and transmitted. Here, the mapping information regarding the CPRBs and the T-RNTIs transmitted in the MIB or SIB may be distinguished by each random access response window (ra_ResponseWindowSize) and transmitted to the UE through separate messages.

As described above, indices of the CPRB may be set in ascending and descending order in a frequency domain or time domain. Also, the indices may be set by combining ascending/descending order of the time domain and frequency domain. Such CPRB index information may be included in an MIB or SIB and transmitted. Also, indices may be assigned according to a rule predefined between the eNB and the UE and the UE may implicitly know an index of each CPRB.

FIG. 25 is a view illustrating a 2-step RACH procedure using a T-RNTI according to an embodiment of the present invention.

In FIG. 25, it is assumed that a single CP group includes a single CP zone and each CP group includes three CPRBs.

Referring to FIG. 25, the eNB transmits mapping information regarding CPRBs and T-RNTIs (T-RNTI mapping for RACH) to the UE through an MIB or SIB (SIB in the case of FIG. 25) (S2501). That is, the eNB transmits T-RNTI information mapped to each CPRB included in each CP group to the UE. Here, the mapping information regarding the CPRBs and the T-RNTIs may be distinguished by predetermined intervals (for example, distinguished by each random access response window (ra_ResponseWindow-Size) and transmitted to the UE through separate messages.

The UE transmits a preamble to the eNB through a PRACH and transmits an RRC/NAS request message simultaneously (namely, the same subframe) or continuously (namely, next subframe) to the eNB (S2503). Here, the RRC/NAS request message is transmitted through CPRB selected based on a UE ID (e.g., IMSI, GUTI, S-TMSI, etc.) or a preamble index within the contention-based PUSCH group (namely, in the CP group) for the RACH procedure or through a randomly selected CPRB.

The UE may obtain information regarding a set of available random access preambles and radio resource used for transmission of the random access preambles from system information. The UE may randomly select a preamble from the set of random access preambles, selects a PRACH resource from the radio resource used for transmission of the random access preambles, and transmit a preamble to the eNB through the selected PRACH resource.

The eNB allocates a T-RNTI to the UE on the basis of the CPRB in which the RRC/NAS request message was transmitted, and transmits an RRC connection setup message identified by the allocated T-RNTI to the UE (S2505).

The eNB allocates a T-RNTI (0x0002 in the case of FIG. 25) to the UE, and transmits an RRC connection setup message to the UE through a PDSCH indicated by a PDCCH identified by the T-RNTI (namely, masked with the T-RNTI) allocated to the UE. The T-RNTI is mapped to a CPRB selected for transmitting the RRC/NAS request message, in a one-to-one manner so as to be allocated. In the example of FIG. 25, when CPRB #1 (2507) is selected from the CP group #1, the T-RNTI is allocated as 0x0002. The RRC connection setup message may include a UE ID (e.g., the C-RNTI) and a timing alignment (TA).

After transmitting the RRC connection request message, the UE monitors to receive a RRC message transmitted with 0x0002 as the T-RNTI allocated on the basis of the CPRB during an X+random access response window (ra_ResponseWindowSize). Namely, the UE attempts to detect a PDCCH masked with T-RNTI 0x0002, and receives an RRC connection setup message transmitted in a PDSCH indicated through information of the detected PDCCH.

Method 2) Implicit Mapping

In the T-RNTI setting method according to an embodiment of the present invention, a T-RNTI may be set through a random value (RV) randomly selected by a UE and a contention-based PUSCH resource block (CPRB). This will be described in detail with reference to FIG. 26.

FIG. 26 is a view illustrating a method of allocating a T-RNTI in the 2-step RACH procedure according to an embodiment of the present invention.

In FIG. 26, it is assumed that a random access response window (ra_ResponseWindowSize) is 6, three CP groups exist within ra_ResponseWindowSize, four CPRBs exist in each CP group, total twelve CPRBs present within the random access window.

A random value set refers to a set of random values available to be used by a UE. Information regarding a random value set is transmitted by an eNB to a UE through an MIB or an SIB in advance. In the case of FIG. 26, 0x0001~0x0002 is illustrated as a random value set.

The UE randomly selects a certain value from among the random value set. For example, the UE may select a random value by using a certain value (e.g., a UE ID or a preamble index selected by the UE) that the UE may have, or randomly. Also, the UE may select one CPRB of the CP group with respect to a PRACH, on the basis of the preamble selected by the UE, the selected random value, or the UE ID (e.g., IMSI, GUTI, S-TMSI, etc.)

In this manner, a T-RNTI may be set between the eNB and the UE by using the random value randomly selected by the UE, the number of CPRBs of the CP group, the selected CPRB index, the ra_ResponseWindowSize, and a subframe index in which the PRACH (or CPRB) is transmitted, through Equation 4 below.

MathFigure 4

$$\text{T-RNTI}=(RV*N)+CPRBID*\text{ra-ResponseWindowSize}+t_{id} \qquad [\text{Math.4}]$$

In Equation 4, N denotes the number of CPRBs of the CP group, and t_id denotes a subframe index in which the UE transmits the PRACH (or the CPRB). Here, the subframe index may be set from 0 to ra-ResponseWindowSize-1 (or maximum value of ra-ResponseWindowSize-1). The ra-ResponseWindowSize is transmitted from the eNB through an MIB or an SIB. As described above, in a case in which n number of contention-based PUSCH resource blocks (CPRBs) in the contention-based PUSCH group, the same T-RNTI should not be allocated within the random access response window (ra-ResponseWindowSize), but a unique T-RNTI may be allocated within the random access response window (ra-ResponseWindowSize) according to a result of calculation of Equation 4.

As described above, the CPRB may be selected on the basis of a transmitted preamble index or a UE-specific parameter such as a UE ID (e.g., IMSI, GUTI, S-TMSI, etc.) or randomly, the CPRB index in Equation 4 may be a value which has been derived by using the preamble index or the UE-specific parameter. In this manner, when the UE-specific parameter is used to drive the CPRB index, the UE may include the UE-specific parameter in an RRC request message and transmit the same.

In the related art, even though different terminals transmit preambles in the same resource block, if different preambles are transmitted, the eNB transmits a random access response through the same RA-RNTI. However, since a preamble index corresponding to each preamble is included in the random access response and transmitted, two UEs can successfully receive a random access response, and thus, occurrence of collision between the two UEs is prevented.

However, in the present disclosure, even though different UEs transmit different preambles, when the UEs transmit each preamble through the same CPRB, they have the same T-RNTI, and thus, the two UEs may collide. However, when the UEs are away from each other significantly within the same cell (for example, one UE is located to be closed to the eNB and the other is located in the vicinity of the boundary of a coverage cell of the eNB), even though each preamble is received using the same CPRB, the eNB may successfully decode the two preambles due to propagation delay, a difference in reception power, and the like. In this case, when the two UEs use different random values, the eNB may allocate different T-RNTIs to both UEs, thus solving collision. Thus, different T-RNTIs may be allocated to each UE transmitting a preamble in the same CPRB according the number of random values included in the random value set. However, when the two UEs are close to each other, if different preambles are transmitted through the same CPRB, since preparation characteristics of eNBs between the two UEs are similar, increasing a possibility of failure of transmitting the preambles of the BS. Thus, it is required to appropriately adjust the number of random values included in the random value set. For example, when a large number of UEs are present within a cell, the random value is adjusted to be small, and when the number of UEs positioned within the cell is reduced, the random value may be adjusted to be great, thereby adjusting dynamically or semistatically.

Meanwhile, all the parameters illustrated in Equation 4 may be not considered according to a CPRB setting method, and different parameters having the same meaning may be used. In this case, T-RNTIs calculated from the parameters having the same meaning may be regarded as having the same meaning.

FIG. 27 is a view illustrating a 2-step RACH procedure using a T-RNTI according to an embodiment of the present invention.

In FIG. 27, it is assumed that one CP group includes one CP zone and each CP group includes three CPRBs.

Referring to FIG. 27, the eNB transmits information regarding a random value set for setting a T-RNTI and a random access response window information (Ra-ResponseWindowSize) to the UE through an MIB or an SIB (SIB in the case of FIG. 27) (S2701). The UE determines that Ra-ResponseWindowSize is 6 through the MIB or SIB received from the eNB, and checks the random values included in the random value set. Here, the random value set transmitted in the MIB or the SIB may be configured as different values for each random access response window (Ra-ResponseWindowSize). In the case of FIG. 27, the random value set is 0x0001~0x0000 and Ra-ResponseWindowSize has 6.

The UE transmits a preamble to the eNB through a PRACH and transmits an RRC/NAS request message simultaneously (namely, the same subframe) or continuously (namely, next subframe) to the eNB (S2703). Here, the RRC/NAS request message is transmitted through CPRB selected based on a UE ID (e.g., IMSI, GUTI, S-TMSI, etc.) or a preamble index within the contention-based PUSCH group (namely, in the CP group) for the RACH procedure or through a randomly selected CPRB. Also, the UE includes a random value selected on the basis of a UE ID or a preamble index or a randomly selected random value from the random value set received from the eNB, in the RRC/NAS request message and transmits the same to the eNB.

The UE may obtain information regarding a set of available random access preambles and radio resource used for transmission of the random access preambles from system information. The UE may randomly select a preamble from the set of random access preambles, selects a PRACH resource from the radio resource used for transmission of the random access preambles, and transmit a preamble to the eNB through the selected PRACH resource.

A T-RNTI may be allocated on the basis of the selected random value and the CPRB. In the example of FIG. 27, it is assumed that a preamble corresponding to preamble index #1 is selected and a random value 1 (0x0001) is selected randomly. Also, in the example of FIG. 27, Ra-ResponseWindowSize is 6 and the number of CPRBs of one CP group is 3. When the UE transmits a preamble selected through the subframe index #0 to the eNB and selects CPRB #1 (2707) from the CP group #1 on the basis of the preamble index #1, the T-RNTI is set to $\{(0x0001*3)+1\}*6+0=0x0018$ through Equation 4 described above.

The eNB transmits an RRC connection setup message identified by the T-RNTI set on the basis of the random value and the CPRB to the UE (S2705). Namely, the eNB allocates the T-RNTI (0x0018 in the case of FIG. 27) and transmits the RRC connection setup message to the UE through a PDSCH indicated through a PDCCH identified by the T-RNTI (namely, masked with the T-RNTI) allocated to the UE. Here, the RRC connection setup message may include a UE ID (e.g., the C-RNTI) and a timing alignment (TA).

After transmitting the RRC connection request message, the UE monitors to receive a RRC message with 0x0018 as the T-RNTI allocated on the basis of the random value and the CPRB during an X+ random access response window (ra_ResponseWindowSize). Namely, the UE attempts to detect a PDCCH masked with T-RNTI 0x0018, and receives an RRC connection setup message transmitted in a PDSCH indicated through information of the detected PDCCH.

Method 3) Setting T-RNTI as Combination of RA-RNTI and CPRB

In the method for setting a T-RNTI according to an embodiment of the present invention, a T-RNTI may be set through an RA-RNTI and a contention-based PUSCH resource block (CPRB).

An RA-RNTI may be determined by using time/frequency information of PRACH resource as in the conventional RA-RNTI setting scheme. Namely, the RA-RNTI may be set on the basis of the index of a first frame the frequency region of the subframe in which the PRACH is transmitted as in Equation 1 described above.

A T-RNTI may be set between an eNB and a UE on the basis of a CRPB as expressed by Equation 5 below. Here, the CPRB may be selected on the basis of a transmitted preamble index or a UE-specific parameter such as a UE IE (e.g., IMSI, GUTI, S-TMSI, etc.) or randomly by the UE.

MathFigure 5

$$T\text{-}RNTI=(RA\text{-}RNTI)*n+CPRB\ index \quad [Math.5]$$

In Equation 5, n denotes the number of CPRBs of a CP zone. Namely, since the RA-RNTI is set on the basis of an index of a subframe and has different values by subframe, n may be calculated as the number of CPRBs of the CP zone.

As described above, since the CPRB can be selected on the basis of the transmitted preamble index or the UE-specific parameter such as UE IE (e.g., IMSI, GUTI, S-TMSI, etc.), or randomly, the CPRB index of Equation 5 may be a value which has been derived by using the preamble index or the UE-specific parameter. In this manner, when the CPRB index is calculated on the basis of the UE-specific parameter in Equation 5, the UE may include the UE-specific parameter in the RRC request message and transmit the same.

The method 3 will be described in detail with reference back to FIG. 23. the UE transmits a preamble to the eNB through a PRACH (the same subframe) and transmits an RRC/NAS request message simultaneously (namely, in the same subframe) or continuously (next subframe) to the eNB (S2301). Here, the RRC/NAS request message is transmitted through a UE ID or a preamble-based CPRB or a randomly selected CPRB in a contention-based PUSCH group (namely, a CP group) for the RACH procedure.

The UE may obtain a set of available random access preambles and information regarding radio resource used for transmission of the random access preambles from system information. Also, the UE may randomly select a preamble from the set of the random access preambles, select a PRACH resource from the radio resource used for transmission of the random access preambles, and transmit the preamble to the eNB through the selected PRACH resource.

The T-RNTI may be set on the basis of an RA-RNTI and a CPRB. In the example of FIG. 23, the UE transmits an RRC/NAS request message through a selected CPRB #1 (2305) together with preamble transmission (namely, in the same frame as the preamble transmission). The number of CPRBs of the CP zone is 3. Here, when it is assumed that the RA-RNTI is 0x0002, the T-RNTI is set to 0x0002*3+1=0x0007 through Equation 5 described above.

The eNB transmits the RRC connection setup message identified by the T-RNTI set on the basis of the RA-RNTI and the CPRB to the UE (S2303). Namely, the eNB allocates the T-RNTI (0x0007 in the case of FIG. 23) to the UE, and transmits an RRC connection setup message to the UE through a PDSCH indicated by a PDCCH identified by (namely, masked with) 0x0007 as the set T-RNTI.

After transmitting the RRC connection request message, the UE monitors an RRCC message transmitted with 0x0007 as the T-RNTI set on the basis of the CRPB during an X+ random access response window (ra_ResponseWindowSize). Namely, the UE attempts detection of a PDCCH masked with the T-RNTI 0x0007, and receives an RRC connection setup message transmitted in the PDSCH indicated through information of the detected PDCCH.

The methods 1 to 3 proposed in the present disclosure may be independently used. Also, without being limited thereto, one or more methods may be combined to be used. Namely, in the case of the methods 1 and 3, a T-RNTI may be additionally applied and set by using a random value of the method 2.

For example, when the method 1 is applied to the example of FIG. 24, CPRBs and T-RNTIs are mapped in a one-to-one manner and set, and thus, different 12 T-RNTIs may be set for each CPRB of each CP group within one random access response window (ra_ResponseWindowSize). This may be interpreted as meaning that 12 UEs may receive an RRC connection setup message within one random access response window (ra_ResponseWindowSize). Further, when the random value of the method 2is used, the RRC connection setup message may be transmitted to a larger number of UEs within one random access response window (ra_ResponseWindowSize). Namely, when the random value set has 0x0001~0x0002, two T-RNTIs may be set on the basis of the two random values (0x0001 and 0x0002) in one CPRB, and thus, the RRC connection setup message may be transmitted to a total of 24 UEs within one random access response window (ra_ResponseWindowSize).

Also, when the method 3 is applied to the example of FIG. 26, in a case in which the RA-RNTI is determined according to the related art scheme, a total of 12 different T-RNTIs may be set in one random access response window (ra_ResponseWindowSize). Namely, since different RA-RNTIs are set in each PRACH region in which a preamble is transmitted, T-RNTIs may be distinguished in each CP group. In addition, since T-RNTIs are distinguished in each index of CPRBs, 12 different T-RNTIs may be set in each CPRB of each CP group random access response window (ra_ResponseWindowSize). Further, when the random value of the method 2 is used, the RRC connection setup message may be transmitted to a larger number of UEs within one random access response window (ra_ResponseWindowSize). Namely, when the random value set has 0x0001~0x0002 as described above, two T-RNTI may be set on the basis of the two random values (0x0001 and 0x0002) in one CPRB, and thus, the RRC connection setup message may be transmitted to a total of 24 UEs within one random access response window (ra_ResponseWindowSize).

Apparatus for Implementing the Present Invention

FIG. 28 is a block diagram of a wireless communication apparatus according to an embodiment of the present invention.

Referring to FIG. 28, a wireless communication system includes a eNB 2810 and a plurality of UEs 2820 belonging to the eNB 2810. The eNB 2810 include both the aforementioned MeNB and SeNB.

The eNB 2810 includes a processor 2811, a memory 2812, a radio frequency (RF) unit 2813. The processor 2811 may be configured to implement the functions, procedures and/or methods proposed by the present invention as described in FIG. 1-27. Layers of a wireless interface protocol may be implemented by the processor 2811. The memory 2812 is connected to the processor 2811 and stores various types of information for operating the processor 2811. The RF unit 2813 is connected to the processor 2811, transmits and/or receives an RF signal.

The UE 2820 includes a processor 2821, a memory 2822, and an RF unit 2823. The processor 2821 may be configured to implement the functions, procedures and/or methods proposed by the present invention as described in FIG. 1-27. Layers of a wireless interface protocol may be implemented by the processor 2821. The memory 2822 is connected to the processor 2811 and stores information related to operations of the processor 2822. The RF unit 2823 is connected to the processor 2811, transmits and/or receives an RF signal.

The memories 2812 and 2822 may be located inside or outside the processors 2811 and 2821 and may be connected to the processors 2811 and 2821 through various well-known means. The eNB 2810 and/or UE 2820 may include a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be substituted with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

Embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, micro-controller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various well-known means.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

The scheme for allocating a T-RNTI to a UE in random access procedure in the wireless communication system has been described by an example of applied to the 3GPP LTE/LTE-A, but it may also be applied to various wireless communication systems other than the 3GPP LTE/LTE-A system.

The invention claimed is:

1. A method for allocating a temporary radio network temporary identifier (T-RNTI) to a user equipment (UE) within a random access procedure in a wireless communication system, the method comprising:
    transmitting, by the UE, a random access preamble to a base station (BS);
    transmitting, by the UE, a radio resource control (RRC) request message to the BS on a contention-based physical uplink shared channel (PUSCH) resource block without receiving a random access response in response to the random access preamble, wherein uplink data on the contention-based PUSCH resource block can be transmitted without uplink resource allocation scheduling; and
    receiving, by the UE, an RRC connection setup message identified by a T-RNTI allocated to the UE in response to the RRC request message,
    wherein the T-RNTI is allocated based on the contention-based PUSCH resource block on which the UE transmitted the RRC request message to the BS.

2. The method of claim 1, wherein the contention-based PUSCH resource block on which the UE transmitted the RRC request message to the BS is selected from among a plurality of candidate contention-based PUSCH resource blocks available to be used by the UE in order to transmit the RRC request message.

3. The method of claim 2, wherein the T-RNTI is mapped to the plurality of candidate contention-based PUSCH resource blocks in a one-to-one manner.

4. The method of claim 3, wherein information regarding mapping between the T-RNTI and the plurality of candidate contention-based PUSCH resource blocks are received from the BS on a master information block (MIB) or a system information block (SIB).

5. The method of claim 1, wherein the T-RNTI is allocated based on a random value selected by the UE and the contention-based PUSCH resource block on which the UE transmitted the RRC request message to the BS.

6. The method of claim 5, wherein the random value is selected from a random set value as a set of random value available to be used by the UE, and information regarding the random set value is received from the BS through a master information block (MIB) and a system information block (SIB).

7. The method of claim 5, wherein the RRC request message includes the selected random value.

8. The method of claim 1, wherein the T-RNTI is allocated based on a random access-RNTI (RA-RNTI) allocated to the UE and the contention-based PUSCH resource block on which UE transmitted the RRC request message to the BS.

9. The method of claim 1, wherein the RRC request message is transmitted in the same subframe in which the random access preamble has been transmitted, or in a next subframe.

10. A user equipment (UE) to which a temporary radio network temporary identifier (T-RNTI) is allocated within a random access procedure in a wireless communication system, the UE comprising:
    a radio frequency (RF) unit; and
    a processor configured to transmit and receive a radio signal,
    wherein the processor is further configured to:
        control the RF unit to transmit a random access preamble to a base station (BS),
        control the RF unit to transmit a radio resource control (RRC) request message to the BS on a contention-based physical uplink shared channel (PUSCH) resource block without receiving a random access response in response to the random access preamble, wherein uplink data on the contention-based PUSCH resource block can be transmitted without uplink resource allocation scheduling, and
        control the RF unit to receive an RRC connection setup message identified by a T-RNTI allocated to the UE in response to the RRC request message,
    wherein the T-RNTI is allocated based on the contention-based PUSCH resource block on which the RF unit transmitted the RRC request message to the BS.

* * * * *